(12) United States Patent
Elwart et al.

(10) Patent No.: US 6,854,264 B2
(45) Date of Patent: *Feb. 15, 2005

(54) COMPUTER CONTROLLED ENGINE ADJUSTMENT BASED ON AN EXHAUST FLOW

(75) Inventors: Shane Elwart, Ypsilanti, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/401,243

(22) Filed: Mar. 27, 2003

(65) Prior Publication Data

US 2004/0187481 A1 Sep. 30, 2004

(51) Int. Cl.$^7$ ................................................. F01N 3/00
(52) U.S. Cl. ............................ 60/285; 60/276; 60/286; 123/443; 701/103
(58) Field of Search ......................... 60/274, 276, 285, 60/286, 297; 123/443; 701/103, 109

(56) References Cited

U.S. PATENT DOCUMENTS

| | | | |
|---|---|---|---|
| 4,006,722 A | 2/1977 | Hata et al. | |
| 4,051,816 A | 10/1977 | Masaki | |
| 4,056,931 A | 11/1977 | Hata | |
| 4,068,473 A | 1/1978 | Masaki | |
| 4,089,310 A | 5/1978 | Noguchi et al. | |
| 4,227,496 A | 10/1980 | Martel | |
| 5,074,113 A | 12/1991 | Matsuoka | |
| 5,377,654 A | 1/1995 | LoRusso et al. | |
| 5,450,837 A | 9/1995 | Uchikawa | |
| 5,570,574 A | 11/1996 | Yamashita et al. | |
| 5,657,625 A | 8/1997 | Koga et al. | |
| 5,661,971 A | 9/1997 | Waschatz et al. | |
| 5,758,493 A | * 6/1998 | Asik et al. | ................... 60/274 |
| 5,894,726 A | 4/1999 | Monnier | |
| 5,954,034 A | 9/1999 | Takagi | |
| 5,974,788 A | 11/1999 | Hepburn et al. | |
| 5,974,793 A | 11/1999 | Kinugasa et al. | |
| 5,983,627 A | 11/1999 | Asik | |
| 6,012,428 A | 1/2000 | Yano et al. | |
| 6,014,859 A | 1/2000 | Yoshizaki et al. | |
| 6,122,910 A | 9/2000 | Hoshi | |
| 6,138,453 A | * 10/2000 | Sawada et al. | ............... 60/277 |
| 6,151,890 A | 11/2000 | Hoshi | |
| 6,186,131 B1 | 2/2001 | Mitsutani et al. | |
| 6,189,316 B1 | 2/2001 | Surnilla et al. | |
| 6,199,373 B1 | 3/2001 | Hepburn et al. | |
| 6,205,773 B1 | 3/2001 | Suzuki | |
| 6,237,330 B1 | 5/2001 | Takahashi et al. | |
| 6,250,074 B1 | 6/2001 | Suzuki et al. | |
| 6,324,835 B1 | 12/2001 | Surnilla et al. | |
| 6,516,612 B1 | * 2/2003 | Yokoi et al. | .................. 60/301 |

FOREIGN PATENT DOCUMENTS

DE 19923481 11/2000

* cited by examiner

*Primary Examiner*—Binh Q. Tran
(74) *Attorney, Agent, or Firm*—Allan J. Lippa

(57) ABSTRACT

A microprocessor-based controller is provided for generated heat in at various locations in an exhaust system of an engine by changing the heat generation technique utilized. In one case, some cylinder air-fuel ratios are modulated between stoichiometry and rich, while others are modulated between stoichiometry and lean. Another approach operates some cylinder lean, while others are modulated between a first rich, and a second, less rich, value. Further, compensation based on engine airflow is also provided. Finally, various methods are described for temperature control and for controlling modulation of air-fuel ratio.

14 Claims, 18 Drawing Sheets

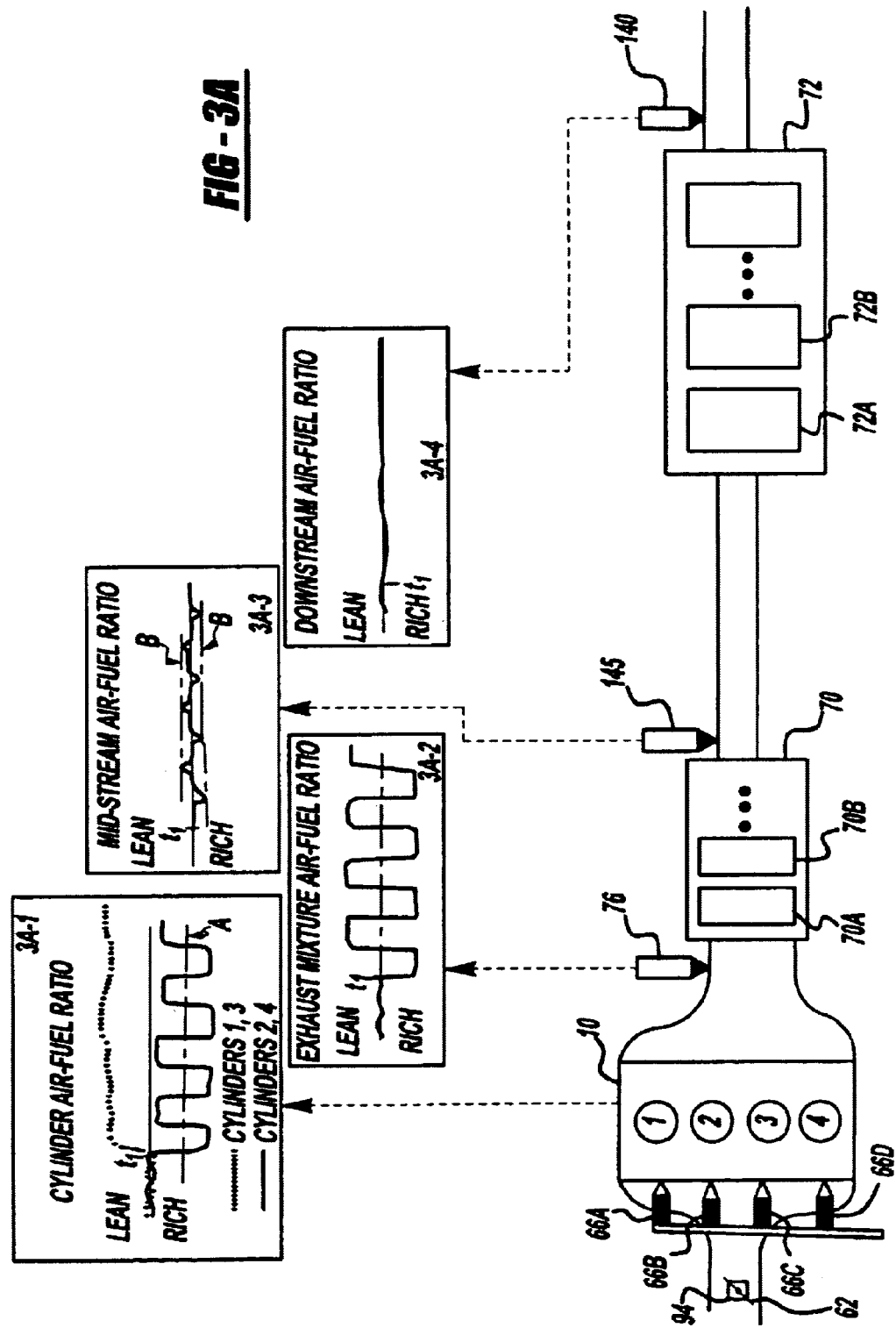

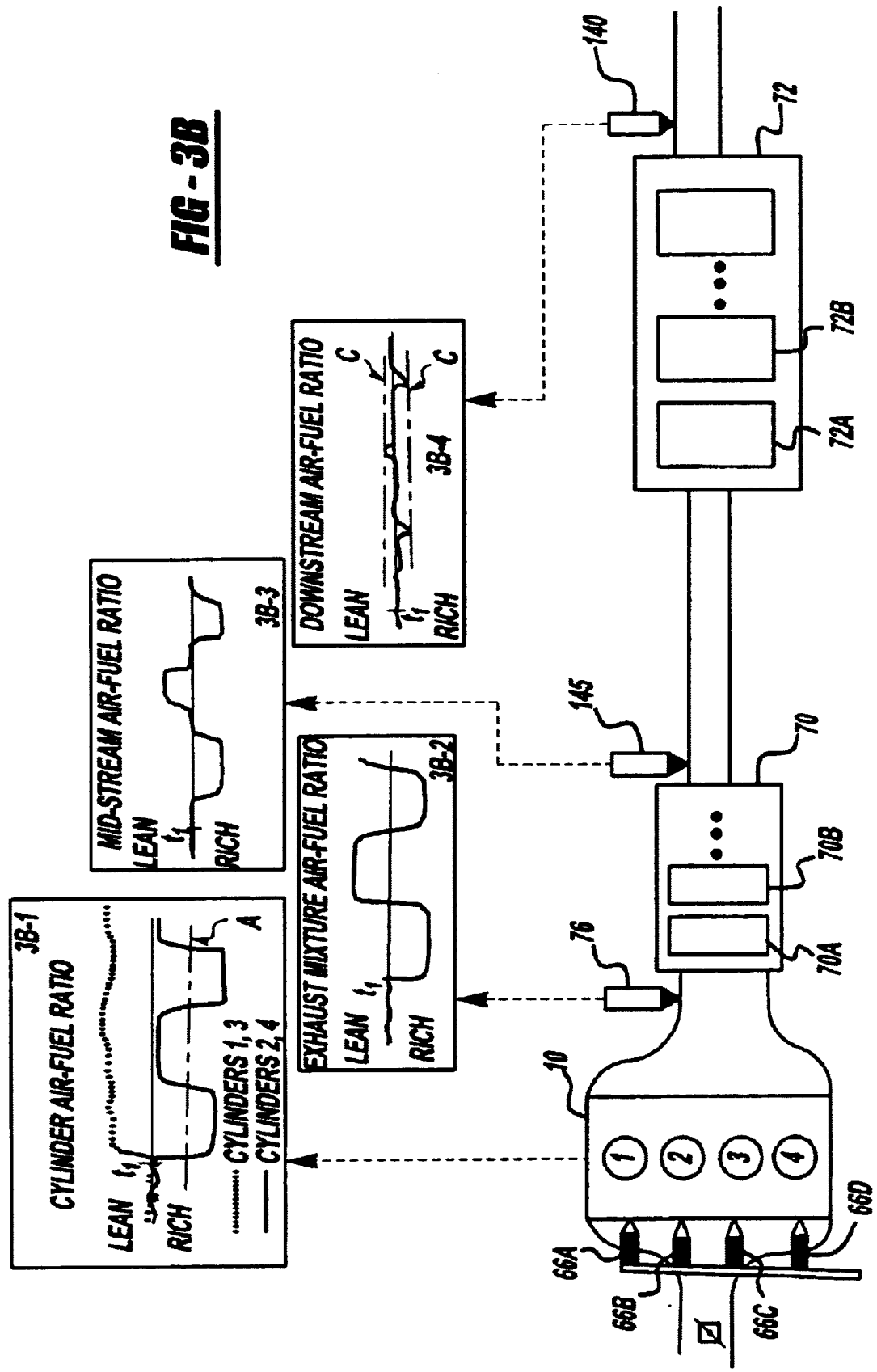

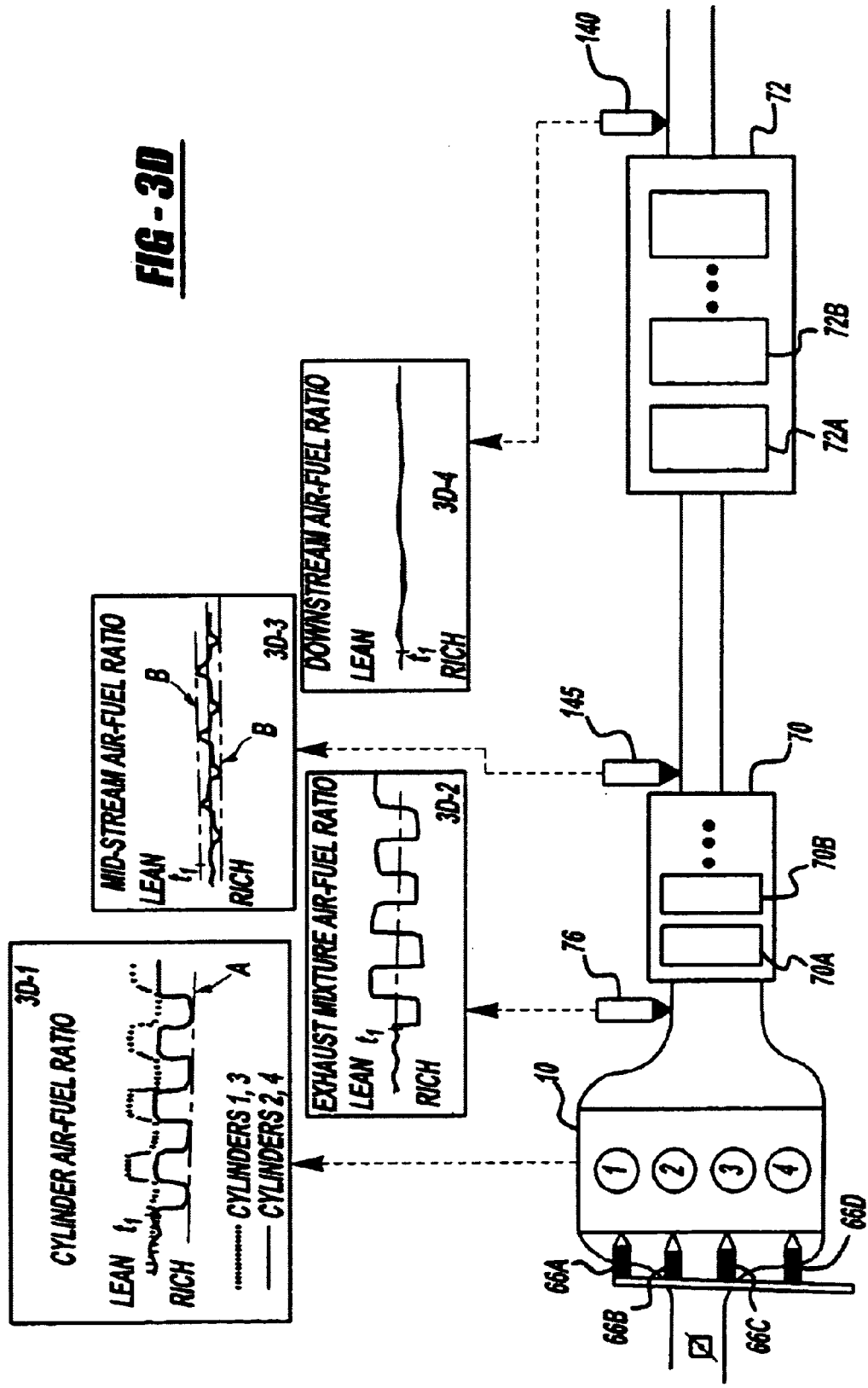

TEMPERATURE CONTROL

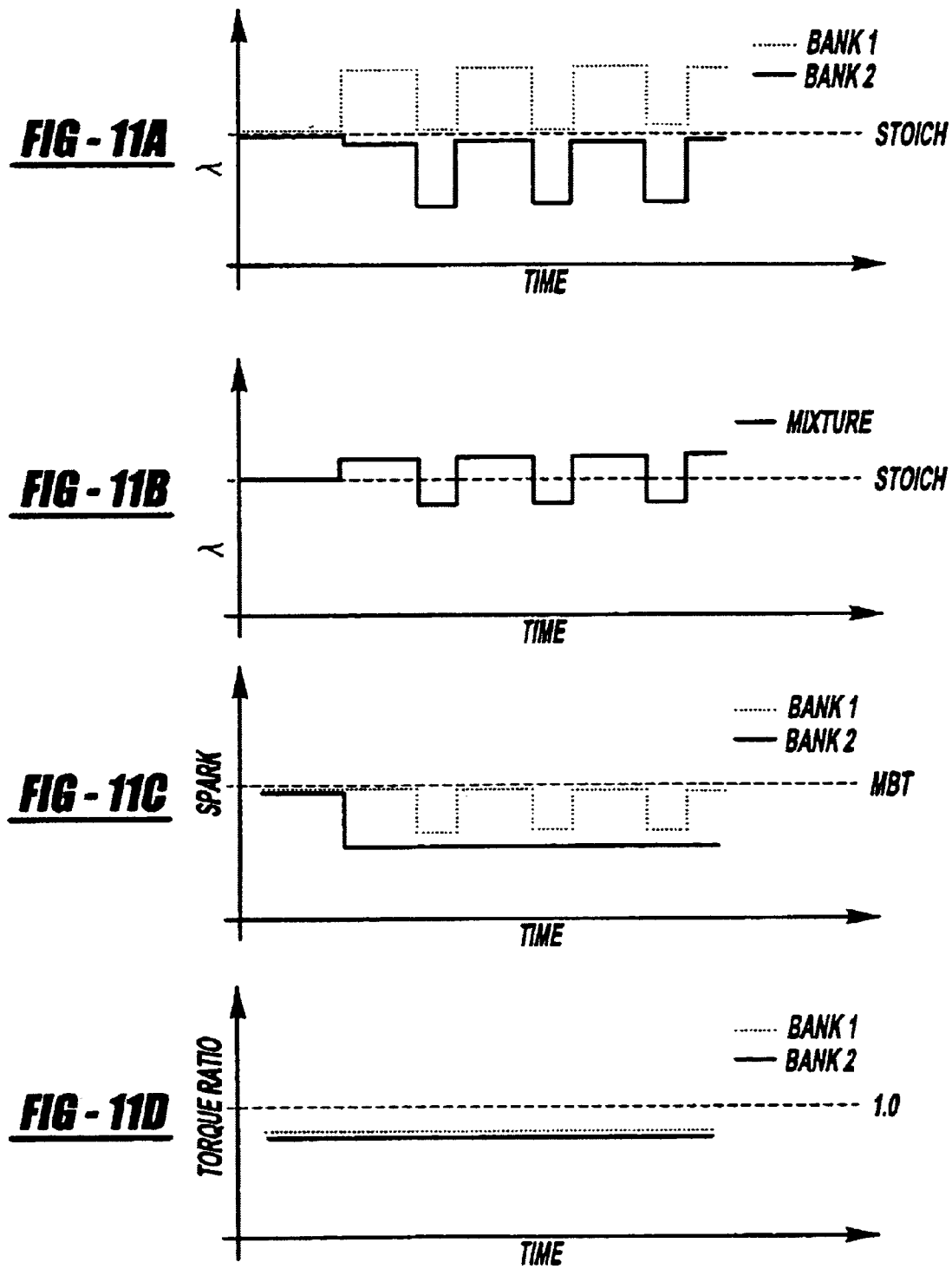

US 6,854,264 B2

COMPUTER CONTROLLED ENGINE ADJUSTMENT BASED ON AN EXHAUST FLOW

BACKGROUND OF THE INVENTION

Engines can be coupled to emission control devices, such as catalytic converters, to reduce exhaust emissions. However, these devices can become contaminated with sulfates, for example. In order to remove these contaminates, the temperature of the emission control device is raised significantly and a near stoichiometric air-fuel ratio is provided that alternates, or oscillates, around stoichiometry (between lean and rich).

One type of engine exhaust system routes all of the engine cylinders into a single exhaust path. One approach for raising temperature of such a single exhaust path sequentially operates some cylinders lean, and then some rich to create heat. Such an approach is described in U.S. Pat. No. 5,974,788, for example.

The inventors herein have recognized numerous disadvantages with such an approach In particular, even with ignition timing adjustments, it is difficult to reduce torque disturbances due to the air-fuel ratio transitions across stoichiometry from significantly lean values to significantly rich values. Furthermore, heat generated in the emission control device is a function not only of oxidant storage, but also of the modulation frequency and heat carried from the exhaust gasses to the emission control device.

SUMMARY OF THE INVENTION

Disadvantages with prior approaches, and more accurate temperature control can be achieved by a system for an engine having at least a first group and a second group of cylinders. The system comprises:
  an emission control device coupled to said first and second groups of cylinders; and
  a computer storage medium having a computer program encoded therein for controlling fuel injected into the first and second group of cylinders, comprising:
    code for, during a first interval, operating said first group of cylinders lean of stoichiometry and said second group of cylinders at a first air-fuel ratio at stoichiometry or rich of stoichiometry;
    code for, during a second interval, operating said second group of cylinders at a second air-fuel ratio rich of stoichiometry and richer than said first air-fuel ratio; and
    code for adjusting both said first and second air-fuel ratio values based on an exhaust temperature and engine flow By adjusting the air-fuel ratios based on engine flow and exhaust temperature, it possible to account, in a feed-forward fashion, for variations in modulation frequency and heat carried from the exhaust gasses. In this way, more accurate temperature control is achieved. Furthermore, by operating the air-fuel ratios in this way during the first and second intervals, it is possible to reduce air-fuel ratio transitions across stoichiometry, potentially reduce variation of the lean-air fuel ratio cylinders, and thereby reduce torque variations.

BRIEF DESCRIPTION OF THE DRAWINGS

The advantages described herein will be more fully understood by reading an example of an embodiment in which the invention is used to advantage, referred to herein as the Description of Preferred Embodiment, with reference to the drawings, wherein:

FIGS. 3A–3D are block diagrams with illustrations of engine operation according to routines of the present invention;

FIG. 11 is a graph illustrating operation according to one aspect of the present invention illustrated in, FIG. 3C.

DETAILED DESCRIPTION OF EMBODIMENTS OF THE INVENTION

Figure 1:
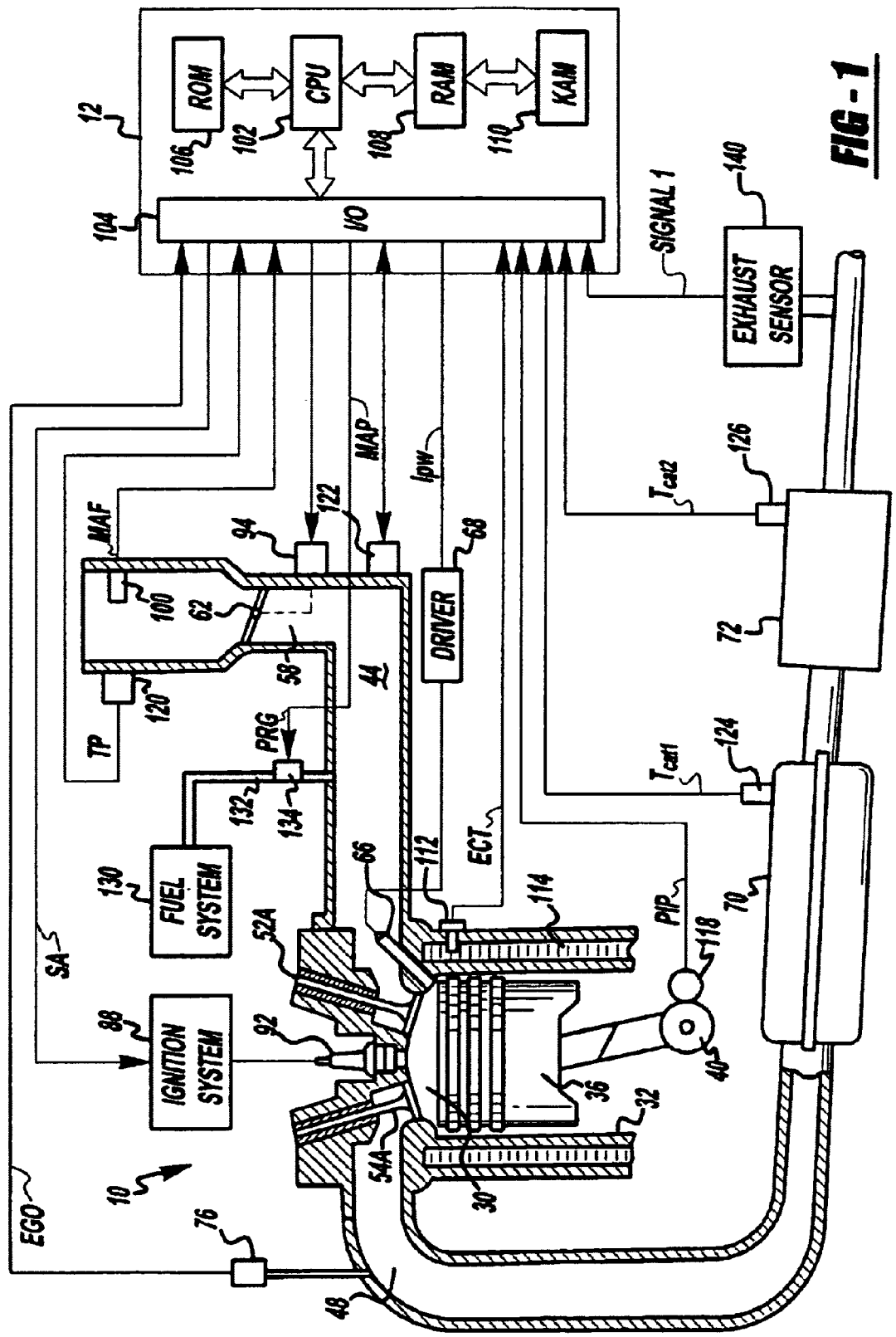
FIGS. 1–2 are block diagrams of an engine and exhaust system.

Direct injection spark ignited internal combustion engine 10, comprising a plurality of combustion chambers, is controlled by electronic engine controller 12 as shown in FIG. 1. Combustion chamber 30 of engine 10 includes combustion chamber walls 32 with piston 36 positioned therein and connected to crankshaft 40. In this particular example, piston 30 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel injector 66 by a conventional high pressure fuel system,(not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of emission control device 70. In this particular example, sensor 76 provides signal EGO, which indicates whether exhaust air-fuel ratio is either lean of stoichiometry or rich of stoichiometry. Signal EGO is used to control engine air-fuel ratio as described in more detail below. In an alternative embodiment, sensor 76 provides signal UEGO to controller 12, which can convert signal UEGO into a relative air-fuel ratio λ (air-fuel ratio relative to the stoichiometric air-fuel ratio, so that a value of 1 is the stoichiometric, with a value less than one indicating rich, and a value greater than one indicating lean). Signal UEGO is used to advantage during feedback air-fuel ratio control in a manner to maintain average air-fuel ratio at a desired air-fuel ratio.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel ratio layers are thereby formed. The strata closest to the spark plug contain a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air-fuel ratio mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Figure 2:
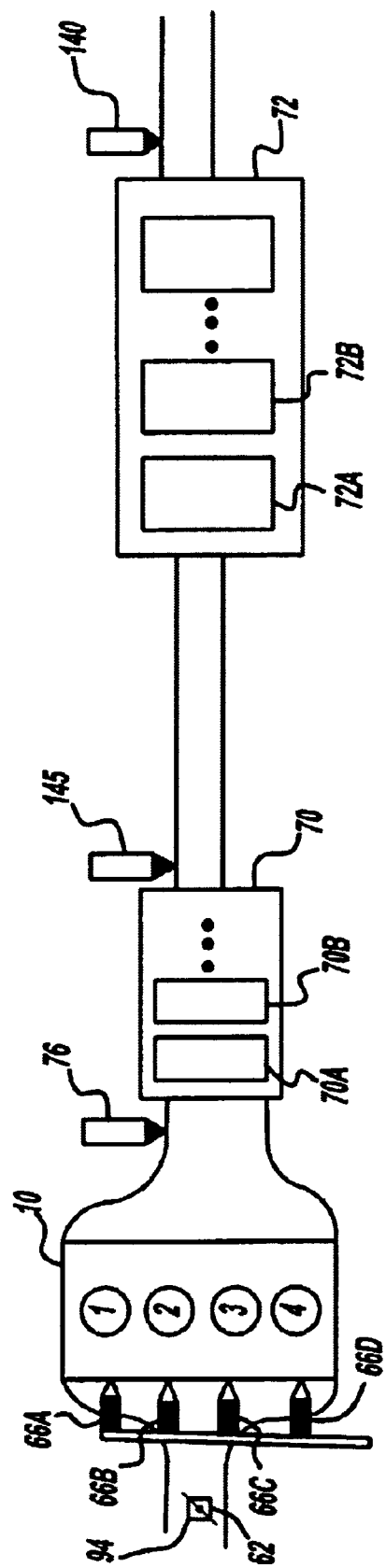

Second emission control device 72 is shown positioned downstream of device 70. Devices 70 and 72 can be various types of emission control devices. As shown in FIG. 2, each device can contain multiple catalyst bricks (70A, 70B, and so on; 72A, 72B, and so on). Alternatively, each can contain a single catalyst brick. In yet another example, the devices can contain just one, two, or three bricks each. Additionally, various types of catalytic converters can be used, such a three-way catalytic washcoats. For example, three way catalysts that absorb NOx when engine 10 is operating lean of stoichiometry can be used. In such catalysts, the absorbed NOx is subsequently reacted with rich exhaust gas constituents (HC and CO, for example) and catalyzed during a NOx purge cycle when controller 12 causes engine 10 to operate in either a rich mode or a near stoichiometric mode.

Controller 12 is shown in FIG. 1 as a conventional microcomputer including: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

In this particular example, temperatures Tcat1 and Tcat2 of devices 70 and 72 are inferred from engine operation. In an alternate embodiment, temperature Tcat1 is provided by temperature sensor 124 and temperature Tcat2 is provided by temperature sensor 126.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

In one example, exhaust sensor 140 is a second EGO type exhaust gas oxygen sensor that produces output signal (SINGNAL1). In an alternative example, sensor 140 can be a UEGO sensor.

While FIG. 1 shows a direct injection engine, a port fuel injection engine, where fuel is injected through a fuel injector in intake manifold 44, can also be used (as is shown in FIGS. 2 and 3A–D). Engine 10 can be operated homogeneously substantially at stoichiometry, rich of stoichiometry, or lean of stoichiometry.

Those skilled in the art will recognize, in view of this disclosure, that the methods described below can be used to advantage with either port fuel injected or directly injected engines.

Note also, that in one example, device 70 is a three-way catalyst, 72A is catalyst as described below, and 72B is lean NOx trap.

In this example, catalyst 72A consists of two zones. It should be noted that this invention also contemplates the use of layers in place of zones. In one embodiment of the invention, these different layer or zones make it possible to physically segregate oxidation components to provide NOx storage, while at the same time providing efficient HC/CO oxidation activity. Note that different phases could also be used.

In one approach, two components are included in the catalyst washcoat such that it would have both NOx storage and high HC/CO conversion activity in the same catalyst. To achieve efficient NOX storage, a highly interacted NO oxidation catalyst and NO2 storage material are used. This is typically a precious metal (Pt) and Ba, but other suitable materials could be substituted, such as cesium or potassium. This allows efficient transfer of the oxidized NO2 to the storage material. Unfortunately, this reduces the activity of the Pt to oxidize HC and CO. Hence, for good oxidation activity, Pt and/or Pd are placed on Al2O3 or Ce/Zr where the Pt/Pd will have good oxidation activity. To create a catalyst with both HC/CO activity and NOx storage, the two phases are segregated so that the Ba does not interfere (or does so less than a preselected amount) with the oxidation activity of the PGM/Al2O3 phase. This can be accomplished by creating separate phases of the material where the Pt/Pd is first fixed on one support (Al2O3 or Ce/Zr mixed oxide) and Pt/Ba mixture is fixed on an Al2O3 support. These separate phases could then be either mixed together and washcoated or preferably could be washcoated as two distinct layers. Another feature of this process would be to use a solvent in which none of the active materials has appreciable solubility so that they would not be mixed when a slurry was prepared in the washcoat process. In this way, the problems with NOx release are overcome. In other words, from a macro viewpoint, a selected amount of precious metal is placed in the washcoat that is not associated with NOx storage materials, such as Ba. In one example, between 30–70% (by mass) of the precious metal is placed in the washcoat that is not associated with NOx storage materials. Specific ranges include: 10–20, 20–30, 30–40, 40–50, 60–70, and/or 80–90. Another example includes 50–80%. Note also that both device 70 and device 72 can include such a catalyst formation.

Referring now to FIG. 2, an alternative view of engine 10 and the engine exhaust system is shown. In this example, engine 10 is shown to be an in-line four cylinder engine (having cylinders 1, 2, 3, and 4). Note that various types of engines can be used with the methods described below such as, for example: a V-type 6-cylinder engine, a V-type 8-cylinder engine, an in-line 4-, 5-, or 6-cylinder engine, or various other engine types. FIG. 2 shows emission control devices 70 and 72 having multiple catalyst bricks. Note that this is just one example showing two or more catalyst bricks in each of the emission control devices. However, emission control device 70 can have two bricks or only a single brick, while emission control device 72 can also have only two bricks, or only a single brick. In this particular example, emission control device 70 has catalyst bricks 70A, 70B, etc. Furthermore, emission control device 72 also has catalyst bricks 72A, 72B, etc.

Also note that in the example of FIG. 2, the upstream EGO sensor is shown coupled in the exhaust manifold 48, while the downstream EGO sensor 140 is shown coupled between bricks 72A and 72B of emission control device 72. In an alternative embodiment, sensor 140 can be a sensor providing both a NOx output signal and an oxygen concentration output signal.

Note that sensors 76 and 140 can be placed in alternate locations in the exhaust system of engine 10. For example, sensor 140 can be placed downstream of emission control device 72 as shown in FIG. 1. Alternatively, sensor 76 can be placed between bricks 70A and 70B. Still another example can be used where sensor 140 is placed directly upstream of the last catalyst brick of emission control device 72.

FIG. 2 also shows a third EGO sensor 145 shown coupled between devices 70 and 72. In one example embodiment, sensor 145 is rendered unnecessary for emission control device diagnostics of devices 70 and 72. However, if desired for improved performance, or other control objectives, a third sensor 145 can be used.

Note that in one example embodiment of emission control device 70 is placed in a close-coupled location to exhaust manifold 48 as shown in FIG. 2. In an alternative embodiment, the device 70 can be placed further away from exhaust manifold 48. Similarly, in one example, device 72 is placed in an underbody location (i.e., below the vehicle body/chassis, for example). However, in an alternate embodiment, device 72 can be placed upstream and coupled near device 70. Also note that, for improved performance, additional emission control devices can be placed in the exhaust system of engine 10.

FIG. 2 also shows engine 10 having four cylinders (labeled 1–4), as well as port fuel injectors 66A–66D. Note that the firing order of engine 10 is not necessarily 1, 2, 3, 4. Rather, it is generally staggered, such as 1–3–4–2, for example.

In one example of the invention, two cylinder groups are utilized. Note, however, cylinder groups could be unequal, or in some other proportion than in two groups of two. E.g., a first group of only one cylinder could be utilized, while a second group of three cylinders could be utilized.

FIG. 3A shows the preheating method where two cylinders are operated lean and 2 cylinders are modulated between rich and less rich, or between rich and stoichiometric. Line "A" shows the approximate rich air-fuel ratio that would, if the rich cylinders were operated at, would produce a mixture air-fuel ratio (when combined with the lean cylinders) approximately at the stoichiometric.

Figure 3C:
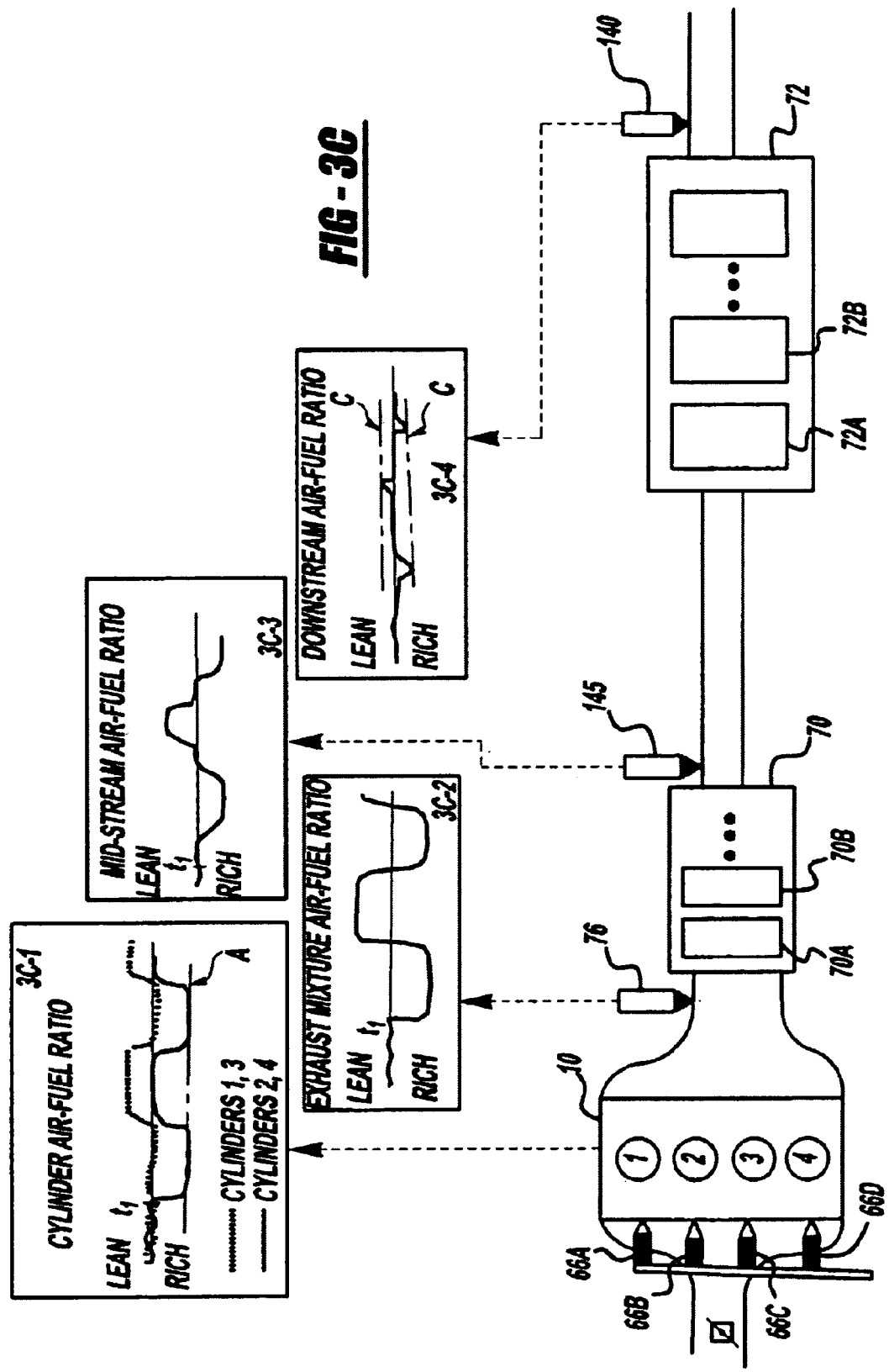
Figure 4:
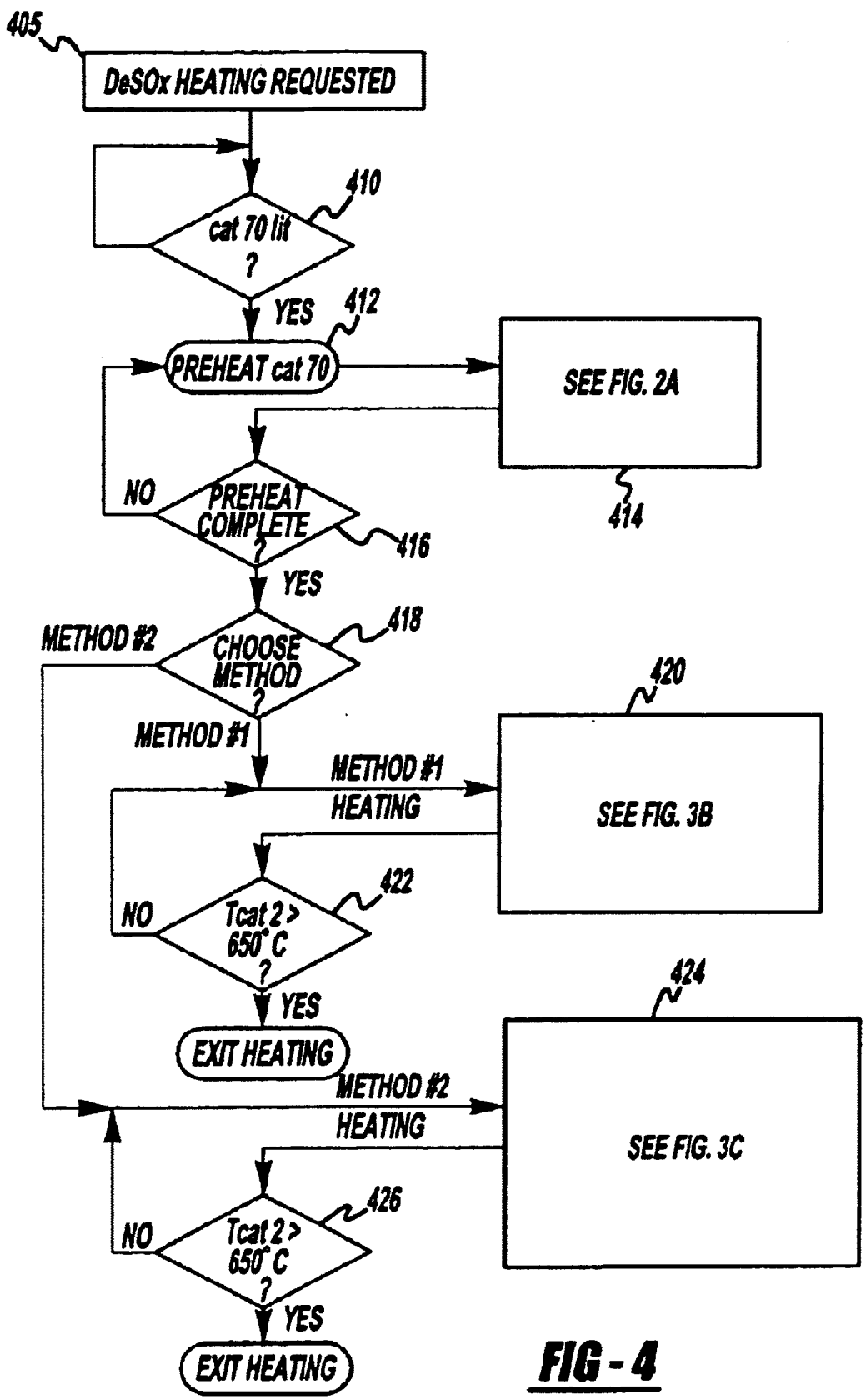
FIGS. 4, 9 and 15 are high level flow charts of various operations performed by a portion of the embodiment shown in FIGS. 1–2.

FIG. 3A shows the air-fuel ratio at four locations in the engine/exhaust system as shown in FIGS. 3A-1 to 3A-4. FIGS. 3A-1 shows the cylinder/engine air-fuel ratios. FIGS. 3A-2 shows the mixture exhaust air-fuel ratio. FIGS. 3A-3 shows the mid-stream air-fuel ratio, while FIGS. 3A-4 shows the downstream air-fuel ratio. The differing methods of FIGS. 3A–C are described below.

In each, the starting time (t1) is shown to correlate the various operations.

Specifically, FIG. 3A shows operating a first group of cylinders lean of stoichiometry and a second group of cylinders to oscillate between a rich and a less rich air-fuel ratio, or between a rich and a stoichiometric air-fuel ratio. According to this example, exhaust heating is provided via multiple sources. In particular, a first source of exhaust heat comes from alternately storing oxidants and catalysts 70A and then releasing and reacting stored oxidants with incoming reductants. The amount of heat generated from this source is a function of the quantity of oxidant storage of the catalyst. It is also a function of the extent to which the oxidant capacity is utilized. For example, if the incoming air-fuel ratio is alternated at a high frequency between lean and rich, then the transition between the lean and rich air-fuel ratios occurs before the full oxidant storage capacity has been reached. As such, less heat is generated than if the air-fuel ratio is operated lean long enough to completely store oxidants in the catalyst to their full oxidant storage at capacity before transitioning from lean to rich and running rich long enough to release and react all of the stored oxidants.

A second source of heat according to the method shown in FIG. 3A is from an exothermic reaction across precious metals of the catalyst by co-existing oxidants and reductants in the incoming exhaust entering the catalyst. In other words, oxidants from the lean cylinders can react with reductants from the rich cylinders, whether the cylinders are at the first rich air-fuel ratio, or the second less rich air-fuel ratio. In either case, there are reductants in the rich exhaust gas that can react across the surface of the precious metal in the catalyst with the oxidants in the lean exhaust gas. As such, the method according to FIG. 3A provides two sources of exhaust heat by advantageously combining both air-fuel ratio modulation (utilizing oxidant storage) as well as co-existing lean and rich exhaust gases to produce exothermic heat via surface reaction across the catalyst.

In the method according to FIG. 3A, the transition between the first rich air-fuel ratio and the second less rich air-fuel ratio shown in FIGS. 3A-1 is determined based on a signal from sensor 145 which is shown in FIGS. 3A-3. In this case the transition between lean to rich and rich to lean of FIGS. 3A-2 (and the transition between the first rich to the second less rich and vice versa in FIGS. 3A-1) is determined by comparing the level of signal 145 to a threshold. In the example, threshold is shown by the dash/dot lines in FIGS. 3A-3 labeled "B". In the example of FIG. 3A, exothermic reactions are produced primarily in the upstream catalyst 70. As such, only minor or insignificant reaction is provided in catalyst 72 as the inlet air-fuel ratio is close to the stoichiometric value and not only deviates for short durations as shown in FIGS. 3A-3. As such, the downstream air-fuel ratio in FIGS. 3A-4 is substantially at the stoichiometric value.

As will be described below, the present invention, in one example, utilizes the method of FIG. 3A when it is desired to generate heat in catalyst 70, or when it is desired to generate heat downstream in the catalyst 72 yet, catalyst 72 has not reached a sufficiently high operating temperature. As such, the present invention utilizes the upstream catalyst to generate heat in the downstream catalyst. Alternatively, the method of FIG. 3A can be used to generate heat primarily in device 70. Furthermore, the method according to FIG. 3A represents a pre-heating method.

In an alternative embodiment, it is possible to operate a first group of cylinders lean and a second group of cylinders rich, repeatedly and continuously, thereby producing a stoichiometric mixture entering upstream device 70 to create an exothermic reaction to heat both devices 70 and 72.

Referring now to FIG. 3B, the method of FIG. 3A is extended to generate heat both in the upstream and downstream catalysts 70 and 72, respectively. The method of FIG. 3B, like the method of FIG. 3A, provides heat from two sources in upstream catalyst 70. In other words, heat is generated from two sources in catalyst 70. The first is related to the oxidant storage of catalyst 70 and the switching inlet air-fuel ratio between being lean and rich. The second relates to heat generated from the incoming, co-existing, lean and rich gases that create exothermic heat by reacting incoming oxidants and reductants across the precious metal on the catalysts. However, the heat is generated in the downstream catalyst primarily by using oxidant storage since a single pipe exhaust system is shown. In other words, the inlet air-fuel ratio to catalyst 72 is the exit air-fuel ratio of catalyst 70, which has already been mixed and therefore is either rich, lean or stiochiomtric. Also, in the example of FIG. 3B, the engine air-fuel ratio is of the second cylinder group (rich cylinder group) is switched between the first rich air-fuel ratio and the second less rich air-fuel ratio based on sensor 140, rather than sensor 145 as shown in FIG. 3A.

Note that rather than using sensor 140 or sensor 145, a determination of conditions in or downstream of the first or second emission control device can be utilized. For example, air-fuel ratio downstream of the first emission control device can be estimated based on operating conditions. Likewise, air-fuel ratio downstream of the second emission control device can be estimated based on operating conditions.

As with FIG. 3A, FIG. 3B shows the air-fuel ratio at various positions in the exhaust system in FIGS. 3B-1, 3B-2, 3B-3, and 3B-4. Since the downstream sensor 140 is utilized to change the air-fuel ratio of cylinders 2 and 4, the frequency of modulation is longer (due to the greater oxidant storage and longer pipe length/delay length). Specifically, as shown in FIGS. 3B-4, a threshold value "C" is utilized to determine when to change the engine air-fuel ratio between the first rich air-fuel ratio and the second rich air-fuel ratio.

In the example of FIG. 3C, an alternative modulation scheme is described. In this example, both cylinder groups are adjusted between varying air-fuel ratio. While this provides some torque disturbance in the group operating between lean and stoichiometry, ignition timing retard can be utilized in the other cylinder group to provide compensation.

The method of FIG. 3C advantageously provides heat utilized oxidant storage of both the upstream and downstream devices 70 and 72, respectively. However, this method minimizes the co-existence of oxidants from lean combustion and reductants from rich combustion entering device 70. As such, this method provides potentially less heat than the methods of FIGS. 3A and B, depending on the span of air-fuel ratios utilized in the different methods. In the case where significantly more oxidant storage is provided in the downstream device 72, it is possible to utilize this method to produce more heat in device 72 than in device 70. As such, sulfur can be removed from device 72 without potentially overheating device 70.

In FIG. 3C, the two groups of cylinders are operated as follows:

The first cylinder group modulates between a rich air-fuel ratio and the stoichiometric air-fuel ratio (note: the stoichiometric operation is not required to be exactly at stoichiometry—for example—it can be slightly to the rich side of stoichiometry, e.g., at a ratio of 14.4 (with approximately 14.6 being stoichiometry)).

The second cylinder group modulates between a lean air-fuel ratio and the stoichiometric air-fuel ratio (note again: the stoichiometric operation is not required to be exactly at stoichiometry—for example—it can be slightly to the lean side of stoichiometry, e.g., at a ratio of 14.8.)

This creates an exhaust gas mixture with an air-fuel ratio that modulates between lean and rich, but there is little to no coexistence of lean and rich gasses.

In the example of FIG. 3C, the transition in the engine air-fuel ratios is determined based on downstream sensor 140 reaching level "C". Furthermore, as described in more detail below, temperature is controlled by controlling at least one of, and potentially both of, the lean and rich air-fuel ratios of the first and second cylinder group. This is illustrated in FIGS. 3C-1 through 3C-4.

FIG. 3D is similar to FIG. 3C, except that heat is primarily generated in device 70 as the engine air-fuel ratio is switched based on sensor 145 rather than 140. In this way, the oxidant storage capacity of the upstream device 70 is utilized, while minimizing heat generating in the downstream device 72. Again, FIGS. 3D-1 through 3D-4 show the air-fuel ratio at various locations in the exhaust system. Specifically, FIG. 3D-1 shows changing a first group of cylinders between a rich air-fuel ratio and stoichiometry, while the second group of cylinders change between a lean air-fuel ratio and stoichiometry.

Referring now to FIG. 4, a routine is described for controlling catalyst heating for removing sulfur from catalyst 70 or 72. First, in step 504, a request is generated to remove the sulfur contaminants. This request can be based on various factors, such as a reduction in reaction efficiency, a reduction in oxidant storage, or a decreased in overall fuel economy obtained during a lean operating mode.

Then, in step 410, the routine determines whether the upstream catalyst 70 has reached a catalyst "light off"

temperature that will support oxidation of incoming reductants and oxidants, or whether oxidants can be stored and later reacted with incoming reductants. When the answer to step 410 is "no", the routine simply continues to monitor upstream catalyst 70. This determination in step 410 can be based on various factors, such as, for example: exhaust manifold temperature, exhaust temperature, and/or temperature of catalysts 70A, 70B, or a composite temperature of device 70.

When the answer to step 410 is "yes", the routine continues to step 412. In step 412, the routine preheats catalyst 70 as shown by the method of FIG. 3A in step 414. From step 414, the routine continues to step 416 to determine whether the preheating has completed. This determination can be made in various ways, such as for example by estimating or measuring temperature of upstream and downstream catalyst 70 and 72, respectively. When the answer to step 416 is "yes", the routine continues to step 418. In step 418, the routine determines which method will be used for heating device 70 and 72 to remove sulfur. This selection is based on various criteria, such as temperatures of devices 70 and 72, as well as catalyst performance or estimated degradation. When method 1 is selected from step 418, the routine continues to step 420 and operates the method according to FIG. 3B. This is continued until in step 422, the routine determines temperature of device 72 has reached 650° C. When the answer to step 422 is "yes", the routine exits the heating.

Likewise, when method 2 is chosen from step 418, the routine continues to step 424 and operates the method according to FIG. 3C. This is continued until the temperature of device 72 has reached 650° C. in step 426. When the answer to step 426 is "yes", the routine continues and exits the catalyst heating.

This high level flow chart illustrates generally how different catalyst heating methods are selected based on operating conditions including exhaust and/or catalyst, and/or device temperature. Thus, according to the one aspect of the present invention, it is possible to provide different catalyst heating methods depending on the operating conditions, and thereby provide differing amounts of heat to differing emission control devices in the exhaust system. For example, the method of FIG. 3A provides heat in two ways to upstream catalyst 70, and heat to catalyst 72 via transfer of heat downstream through the exhaust system by the exhaust gas. However, heat is generated in both the first and second devices 70 and 72 via the method according to FIG. 3B. In FIG. 3B, heat is generated in two ways in the upstream emission control device in one way and the downstream emission control device. Lastly, in FIG. 3C, heat is generated in the same way in both the upstream and downstream emission control device 70 and 72, respectively. In this way, differing amounts of heat can be allocated at different positions in the exhaust system depending on operating conditions. Note that this is simply one example according to the present invention.

Referring now to FIG. 5, several examples show how temperature is controlled by adjusting the level of lean, rich, or both. In these Figures, "x" indicates a combustion event at a specified desired air-fuel ratio, and specifically, an "x" in a circle are for the first group, and an "x" without circle are for the second group. Further, "L" indicates lean, and "R" indicates rich. Finally, the dash-dot line indicates the average rich value.

Figure 5A:
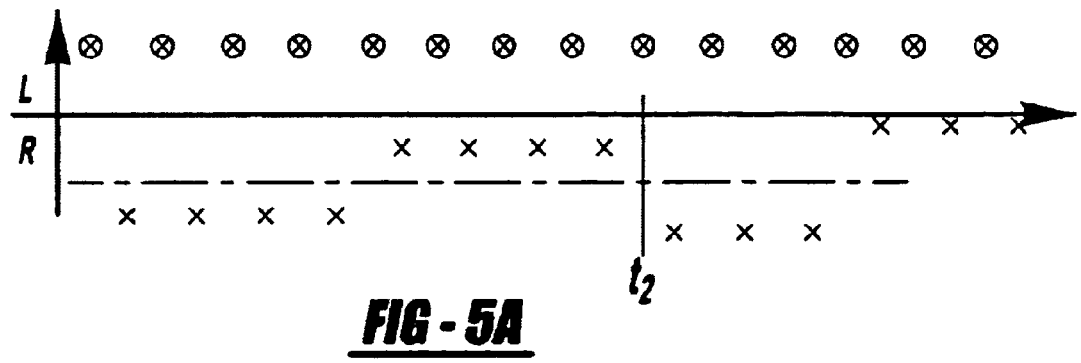
FIGS. 5A–5D are graphs illustrating cylinder-by-cylinder operation according to different methods of the present invention.

In the example of FIG. 5A, the amplitude modulation of the rich group of cylinders is adjusted to increase heat generation at time t2. Note, changing the difference between the rich and less rich levels (at time t2) affects frequency of modulation automatically (since, in one example, frequency is controlled by switching of the downstream sensor). In this way, the heat generated due to oxidant storage capacity per unit time is increased. I.e., the oxidant storage effect is cycled at higher frequency so a greater heat input per time is achieved, thereby raising temperature. Such is shown in FIG. 5A.

Figure 5B:
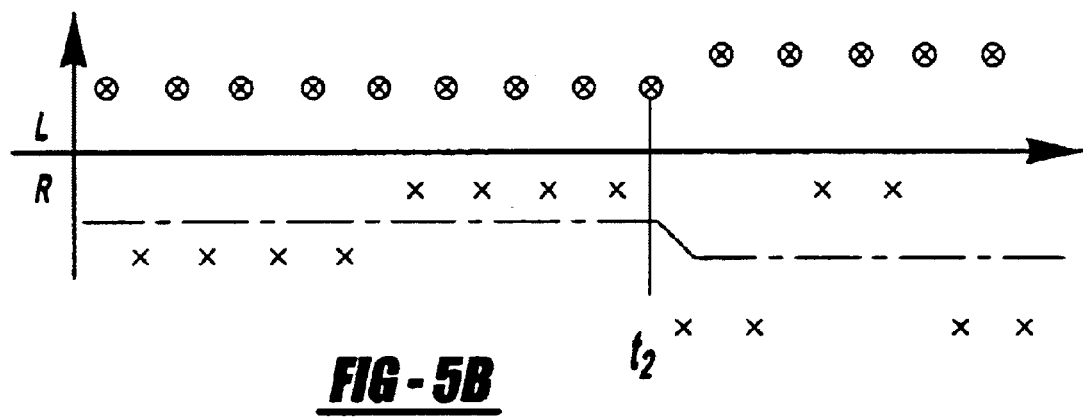

Note that both effects (oxidant storage and coexisting oxidant and reductant reaction) are used to generate additional heat in FIG. 5B (at time t2). Here, co-existing oxidants and reductants are increased because an increased quantity of oxidants and reductants are present (because the difference between the average lean and average rich air-fuel ratio is increased).

Figure 5C:
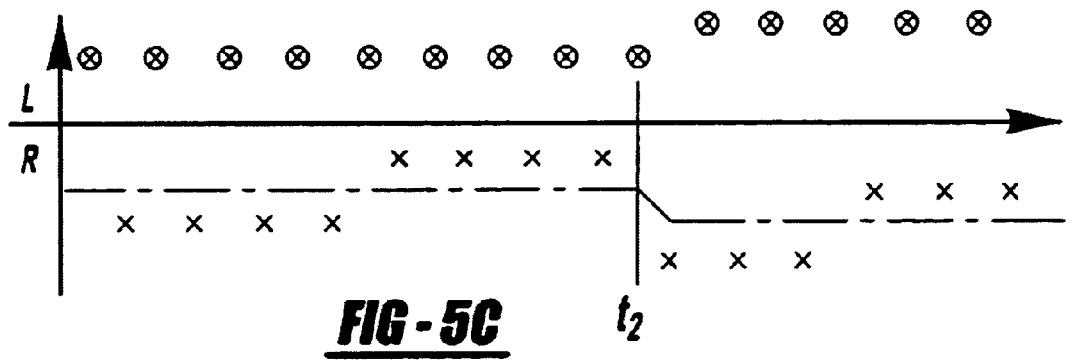

In FIG. 5C, only the span between the average lean and rich air-fuel ratios is adjusted, without changing modulation frequency. In this way, the heat generated by coexisting oxidants and reductants is increased.

Figure 5D:
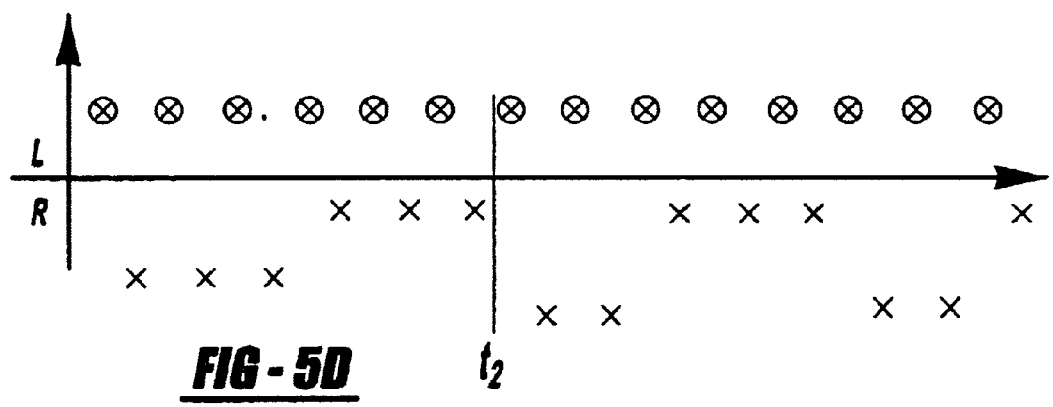

Finally, FIG. 5D shows only adjusting the rich group, resulting in asymmetric cycling. In other words, the amplitude of the rich cylinder group modulation is increased, thereby increasing generated heat due to the oxidant storage reactions. However, only one rich level is adjusted (the richer value), thereby resulting in asymmetric modulation.

Any of the approaches in FIGS. 5A–D can be used with either or both methods of FIG. 3A or 3B.

Figure 6A:
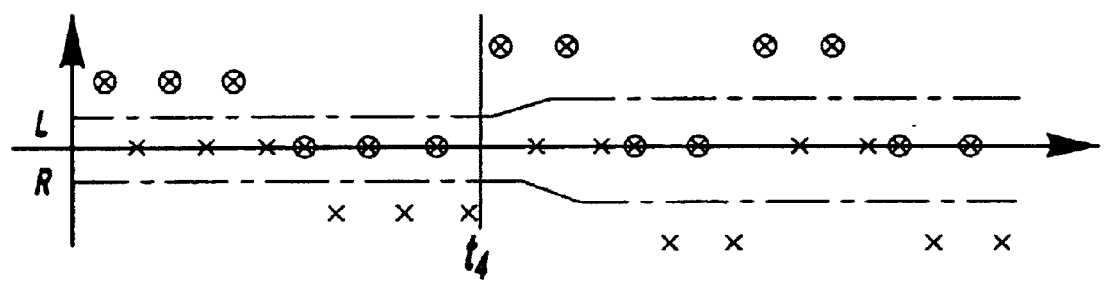
FIGS. 6A–6B are graphs illustrating cylinder-by-cylinder operation according to different methods of the present invention.
Figure 6B:
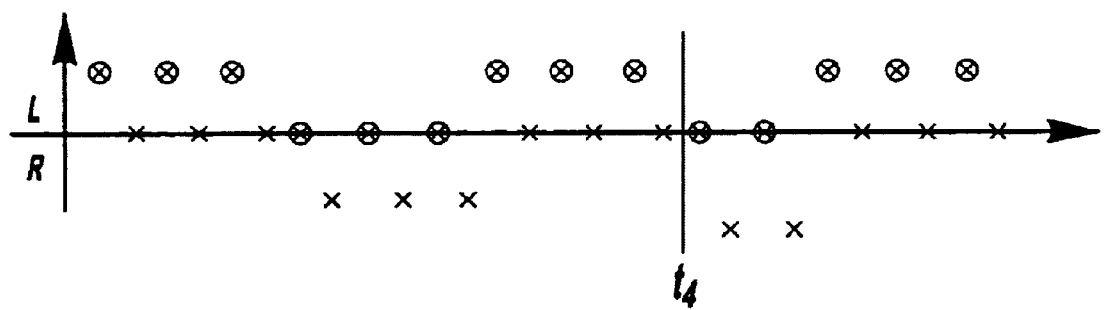

Referring now to FIGS. 6A and 6B, example modulation according to another method of the invention is described. In this case, both the first and second groups of cylinders are modulated. In each case, heat generation due to coexistence of oxidants and reductants is reduced, or minimized. As shown in FIG. 6A and 6B, an adjustment is made at time t4 to increase heat generated. In FIG. 6A, the level of both the rich and lean air-fuel ratios are increased, while in FIG. 6B, only the level of the rich group is adjusted (resulting in asymmetric cycling).

FIGS. 6A–B shows methods that can be used with either or both methods of FIG. 3C or 3D. Note that FIGS. 6A–B and 5D show examples of asymmetric cycling, while FIGS. 5A–C shows symmetric air-fuel ratio cycling. Also, the methods of FIGS. 6A–B and 5D adjust the rich air-fuel group to control temperature without changing, or only slightly affecting, the average lean air-fuel ratio.

Note that the examples of FIGS. 5 and 6 show changing of temperature without changing certain engine conditions. E.g., if air-mass were changing, this may affect frequency of switching and desired air-fuel levels.

Figure 7:
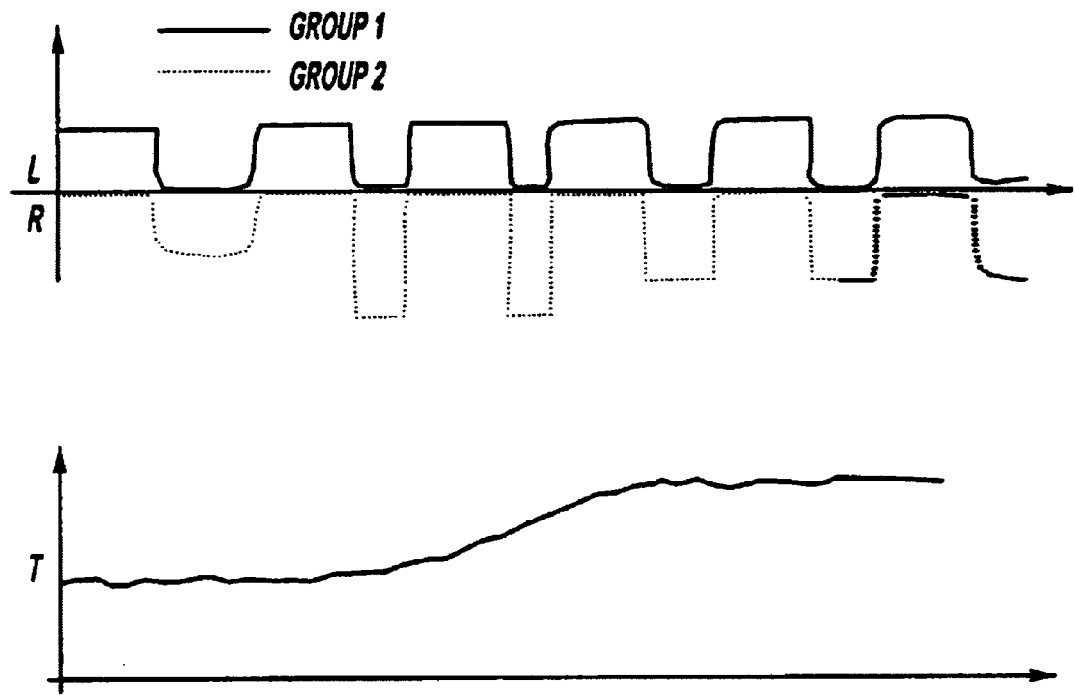
FIG. 7 is a graph illustrating air-fuel ratio and exhaust temperature results according to one example operation of the present invention.

FIG. 7 shows more description of the example in FIGS. 6B along with corresponding exhaust temperature, thereby illustrating the feedback control achieved by this example of the present invention.

As such, according to the methods described above, it is possible to adjust temperature by adjusting air-fuel of one bank, or both banks. Further, by selecting the appropriate heat generation method, it is possible to adjust where in the exhaust system differing amounts of heat is generated.

Figure 8:
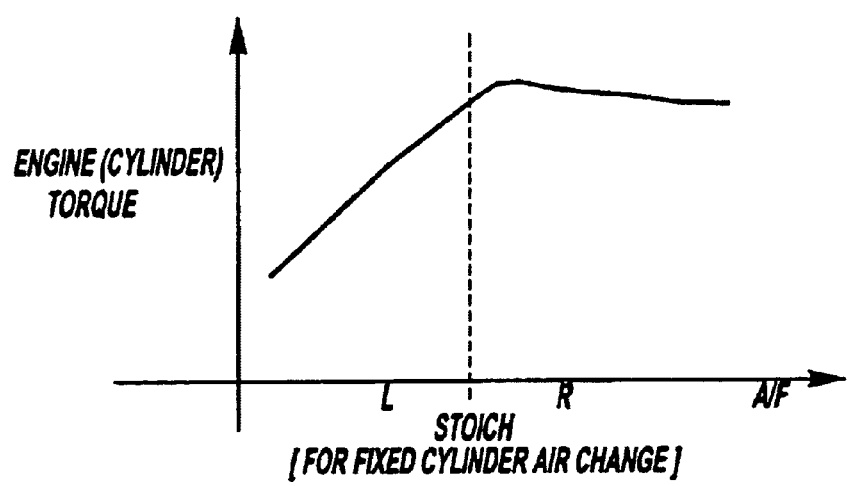
FIG. 8 is a graph illustrating the relationship between engine torque and air-fuel ratio for fixed airflow and optimal ignition timing.

Referring now to FIG. 8, a graph illustrates variation of cylinder engine torque with cylinder air-fuel ratio for a fixed cylinder air charge. Note that for a given change in a lean air-fuel ratio; larger engine cylinder torque variation is produced compared with a similar variation in a rich engine air-fuel ratio as illustrated in the Figure. As such, various examples of the present invention described above herein, advantageously utilize greater variation in the rich cylinder group air-fuel ratios than the lean cylinder group air-fuel ratios. In this way, air-fuel ratio modulation can be provided with reduced variation in engine cylinder torque variation and thus improved drive fuel.

Figure 10:
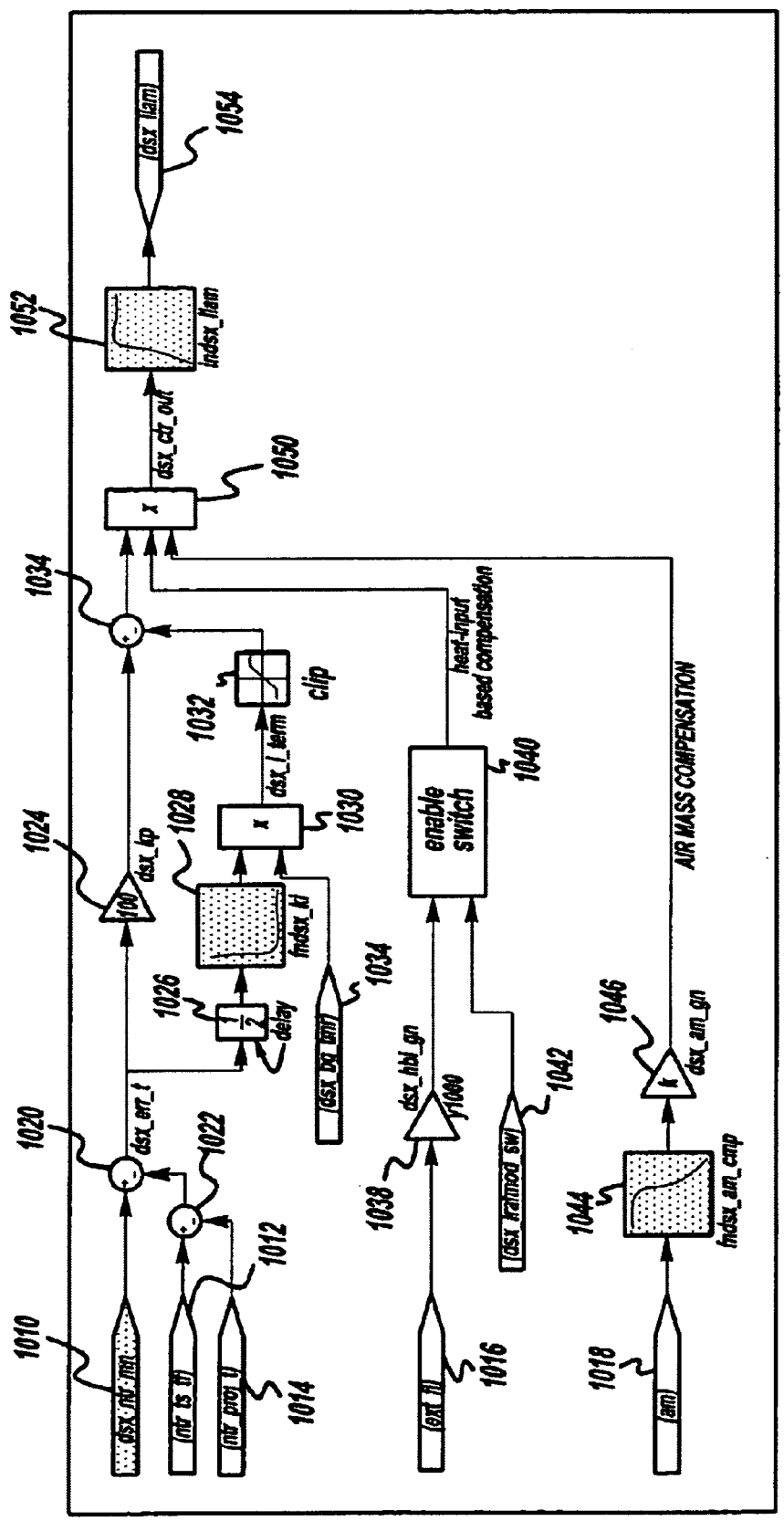
FIG. 10 is a control block diagram showing a portion of the operation of FIG. 9.

The following are definitions of parameters used in the various example control methods described herein.

dsx_ntr_mn=desired temperature for downstream emission control device 72.

ntr_ts_tf=estimated or measured temperature of downstream emission control device 72. Note that in an alternative embodiment, temperature of a particular brick (or set of bricks) in a device can be used as the control setpoints/measurements. Thus, in one example, this value is equal to Tcat2. In an alternative example, it represents temperature of a particular brick, e.g. 72B of device 72.

ntr_proj_t=adjustment to account for transient temperature changes in estimated or measured temperature of downstream emission control device 72. Note: in an alternative embodiment, this adjustment can be ignored.

dsx_err_t=error between the desired and actual/estimated temperature.

z=discrete operator known to those skilled in the art of digital signal processing.

dsx_kp=proportional gain in PI (proportional-integral) feedback control system.

fndsx_ki=integral gain in PI (proportional-integral) feedback control system. Note, in one example, this can be a single value. In another example, as described below, this can be a variable gain.

dsx_i_term=integral control term.

dsx_hbi_gn=heat based input control gain.

ext_fl=flange temperature of exhaust manifold in degrees F.

dsx_lrafmod_sw=enabling switch to use heat based input control action. Note, the enable switch block outputs a one if not enabled, and passed through the top input when enabled.

am=air mass value from mass air flow sensor (or estimated from manifold absolute pressure sensor and engine speed).

fndsx_am_cmp=calibratable function to modify air mass compensation control.

dsx_am_gn=calibratable gain to modify air mass compensation control.

dsx_ctr_out=control output which is the sum of the PI controller, heat based input controller, and air mass compensation.

fndsx_llam=function to transform control output to a desired lean air-fuel ratio.

dsx_llam=output of controller in FIG. 10, which is the desired lean air-fuel ratio.

dsx_bg_tmr=background timer.

Figure 9:
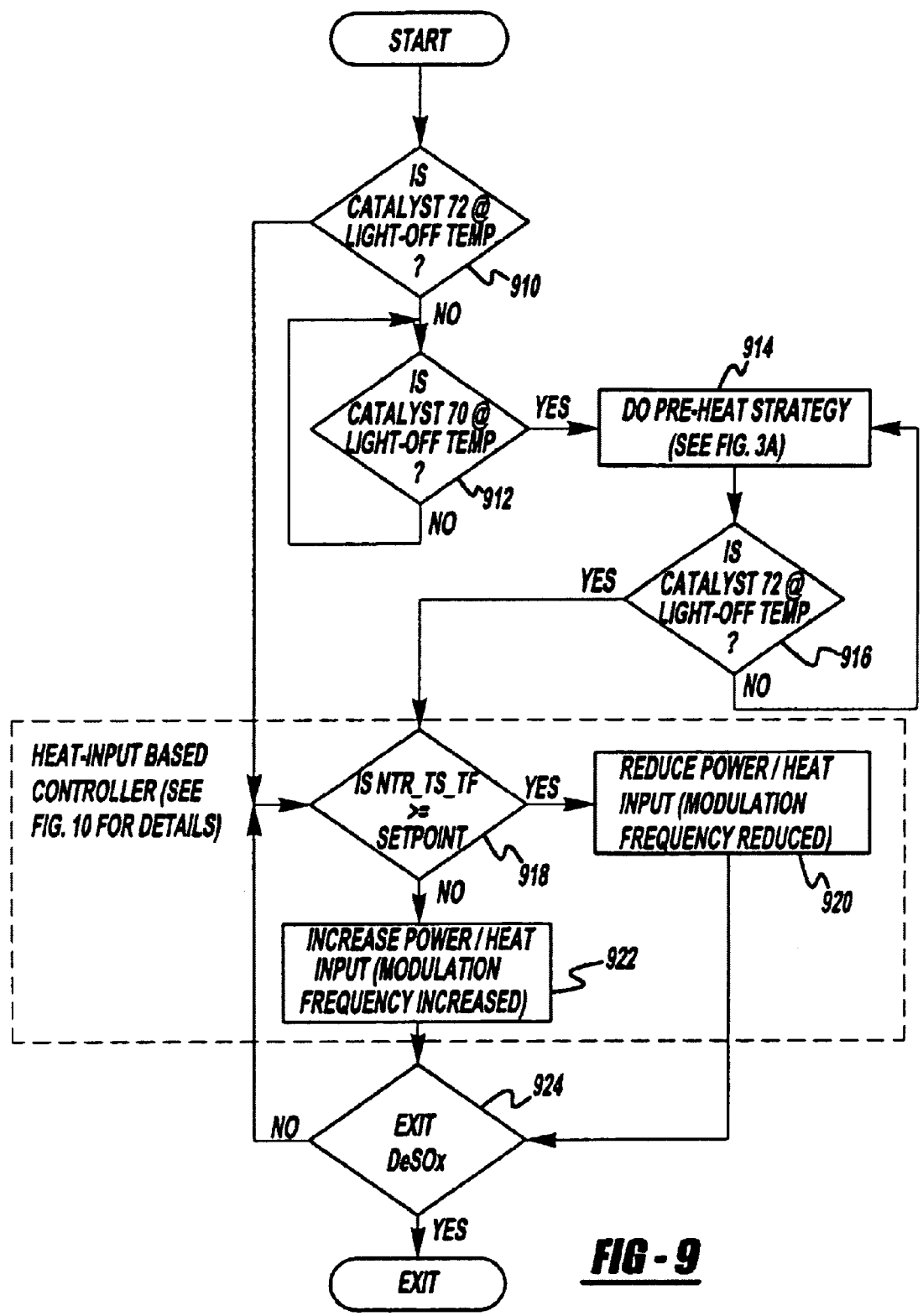

FIGS. 9–10 describe how air-fuel ratio is controlled to provide desired heat generation. In general, a desired lean (or rich, or both) level (depth) of air-fuel ratio modulation needed to keep temperature of device 72 above the desired temperature is determined. Note that by changing the amplitude of the lean, or rich, or both, air-fuel ratio results in a change of modulation frequency since the methods described below switch based on a downstream air-fuel ratio sensor. Note that, in an alternative embodiment, the sensor based switching can be replaced with other switching methods, e.g., based on an estimate of stored oxidants.

FIG. 10 shows detail of the control, while the high level flowchart is shown in FIG. 9.

Referring now to FIG. 9, the routine is described for controlling heat input during desulphurization of the emission control device. First, in step 910, the routine determines whether catalyst 72 is at a light "off" temperature. When the answer to step 910 is "yes", the routine continues to step 918 as will be described below. When the answer to step 910 is "no", the routine continues to step 912 to determine whether catalyst 70 is at the light "off" temperature. When the answer to step 912 is "no", the routine repeats and continues to monitor whether catalyst 70 has reached the light "off" temperature.

Once catalyst 70 has reached the light "off" temperature, and the answer to step 912 is "yes", the routine continues to step 914. In step 914, the routine performs the pre-heating strategy as described above herein with regard to FIG. 3A. Then, the routine continues to step 916 to monitor whether the temperature of catalyst 72 has reached the light "off" temperature. If the answer to step 916 is "no", the routine returns to step 914 and continues the pre-heating strategy until catalyst 72 has reached the light "off" temperature.

Once the catalyst has reached light "off" temperature, and the answer to step 916 is "yes", the routine continues to step 918.

Steps 918 through 922 generally describe the heat input based controller of one example of the present invention. The details of the heat input based controller are described more fully below with regard to FIG. 10. However, in general terms, in step 918, the routine determines whether the temperature of a downstream break-in device 72 is greater than or equal to a set point temperature. If the answer to step 918 is "yes", the routine reduces the power/heat input by reducing the amplitude of the lean and/or rich air-fuel modulation of the air-fuel mixture entering device 72. This results in reduced modulation frequency, and therefore less heat input, as will be described below. Alternatively, when the answer to step 918 is "no", the routine increases the power/heat input by increasing the amplitude of the lean and rich air-fuel mixtures device 72, thereby increasing modulation frequency as will be described below.

Note that increasing or decreasing air-fuel ratio amplitude in the modulation affects the modulation frequency since the switching between lean and rich mixtures is governed by downstream sensor 140 in the example where heat is being generated in device 72. In other words, the greater the amplitude of the lean and rich alternate mixtures entering the device, the faster the device is filled and purged of oxygen. Thus, the greater the heat input per unit time. Also, this results in faster filling and purging, and therefore faster switching of the downstream sensor 140. This, therefore, results in higher frequency modulation. Conversely, when decreasing amplitude of the lean and rich modulation, this correspondingly decreases modulation frequency and decreases heat input per unit time.

From both steps 920 and 922, the routine monitors in step 924 whether desulphurization should be exited. When the answer to step 924 is "no", the routine returns to step 918. Alternatively, when the answer to step 924 is "yes", the routine exits.

Referring now to FIG. 10, details of the heat input based controller are shown via a control system block diagram. The routine parameter inputs are shown by blocks 1010 through 1018. As shown in FIG. 10, the desired temperature from block 1010 is fed to summation 1020. Further, the estimated temperature (summation of blocks 1012 and 1014 at block 1022) is also fed to summation 1020. In this way, a desired and actual temperature is used to create a temperature error, which is the output of summation 1020. This error is then fed through a PI controller. The proportional gain is shown by the triangle 1024 with an example gain of 100. The integral control action is shown via blocks 1026 through 1032. A timer input is shown in block 1034. Block 1026 represents a delay of the input temperature error signal. Block 1020 represents a variable integral gain which is multiplied in block 1030 by the background timer. This integral term is then clipped in block 1032. Summation block 1034 then adds the proportional and integral control gains.

A heat input based compensation is used based on the exhaust flange temperature, which can be estimated or measured, from block 1016. In particular, in block 1038, a gain is applied to this temperature value (in this example $1/1000$). Further, in block 1040 an enabling switch is used based on the flag in block 1042. The flag in block 1042 changes between 0 and 1 depending on engine operating conditions such as, for example, time during catalyst desulphurization, air-fuel ratio modulation, and various others. Enable switch end block 1040 either passes through the upper input value, or passes a value of one depending on the switch 1042.

Finally, an air mass composition (feed forward) term is utilized based on the air mass signal from block 1018.

The air mass compensation term is based on a first function gain (1044) and a second gain (1046) applied to the air mass signal from block 1018.

The combination of the PI controller, heat input based compensation, and air mass compensation are all multiplied together in block 1050. The control output from block 1050 is fed through a gain function 1052 to produce a desired lean air-fuel ratio amplitude amount in block 1054. Note that in this example, the amplitude of the lean air-fuel ratio modulation is determined. However, in an alternate embodiment, an air-fuel span (amplitude) between the lean and rich values could also be used. Alternatively, a desired rich air-fuel ratio amplitude could be the system output.

Note that the heat input based compensation estimates the heat from the exhaust gas that will be carried to the downstream device 72. I.e., it is based on the exhaust manifold flange temperature (ext_fl). In this way, it is possible to provide feedforward compensation based on heat from sources other than air-fuel modulation (oxidant storage based exotherm).

In summary, the air-fuel modulation is controlled to maintain a desired temperature of device 72, with feedforward compensation to change the air-fuel modulation to account for changes in air mass and exhaust gas temperature effects.

Note that when air mass compensation and heat input based compensation is utilized, the controller advantageously compensates for changes in engine operation. I.e., changes in these conditions change heat carried through exhaust system, and change modulation frequency by changing system delay. Therefore, by compensating for these effects in a feed-forward fashion, more accurate temperature control can be achieved. However, as indicated, neither compensation method is required. Furthermore, combinations thereof can be used. Note also that the feed-forward adjustment example for temperature control is based on air mass. However, other air amounts can be used, such as exhaust flow rate, airflow rate, or cylinder air charge.

Referring now to FIG. 11, a graph illustrates operation according to one method of the present invention (see FIG. 3C). In this case, as shown in the top graph (FIG. 11A), one cylinder group (bank 1) is modulated between approximately stoichiometry (or slightly lean of stoichiometry), and a lean air-fuel ratio, as shown by the solid/dot line. The other cylinder group (bank 2) is modulated between approximately stoichiometry (or slightly rich of stoichiometry), and a rich air-fuel ratio, as shown by the solid line. The coordinated switching of air-fuel ratios is based on the downstream oxygen sensor 140 reaching a threshold value, for example.

The second graph (FIG. 11B) shows the mixture air-fuel ratio changing between an average rich and lean air-fuel ratio.

The third graph (FIG. 11C) shows the spark retard utilized for the two cylinder groups. The lean cylinder group requires some ignition timing modulation to account for the variation in engine torque when changing between lean and less lean values (see FIG. 8), while no modulation is used with the second bank modulating between rich and less rich. In this way, the torque disturbance due to modulation is reduced.

The fourth graph shows the resulting torque ratio of the two banks being approximately equal (indicating the torque output of the engine should be consistent), thereby providing good customer satisfaction.

Another approach to generating heat in devices 70 and/or 72 (or portions thereof) and removing sulfur from device 72 (for example) is now described with regard to FIGS. 12–15. In other words, as described above, the changing between lean and rich air-fuel ratio was governed by various air-fuel ratio sensors. Depending on which sensor was utilized, heat could be generated in different amounts in different locations of the exhaust system. Further, to control the amount frequency of modulation, the richness, or leanness, of the air-fuel ratio was adjusted.

In the approach of FIGS. 12–15, modulation is controlled in a different way to control the location and amounts of heat generated in the exhaust system. In general terms, the catalyst(s) where heat is to be generated are filled to saturate oxygen storage (and possibly, but not necessarily, NOx storage) by operating lean. This is determined by, for example, monitoring a downstream air-fuel sensor, just as in the previous examples. Then, rich operation is utilized for to provide a specified amount of reductant (or operated for a predetermined amount of time) to generate an exothermic reaction. However, this rich operation is terminated before the downstream sensor indicates breakthrough of reductants. In this way, the exhaust system is modulated to generate heat and remove sulfur with reduced breakthrough of reductants and only breakthrough of oxidants. Further, it is possible to concentrate heat generation in the front portion of an emission control device and thereby provide more even heating across the device. This results in more even thermal wear, and more even removal of sulfur. In other words, it is possible to obtain better sulfur removal with less thermal degradation since more even heating is achieved.

Figure 13:
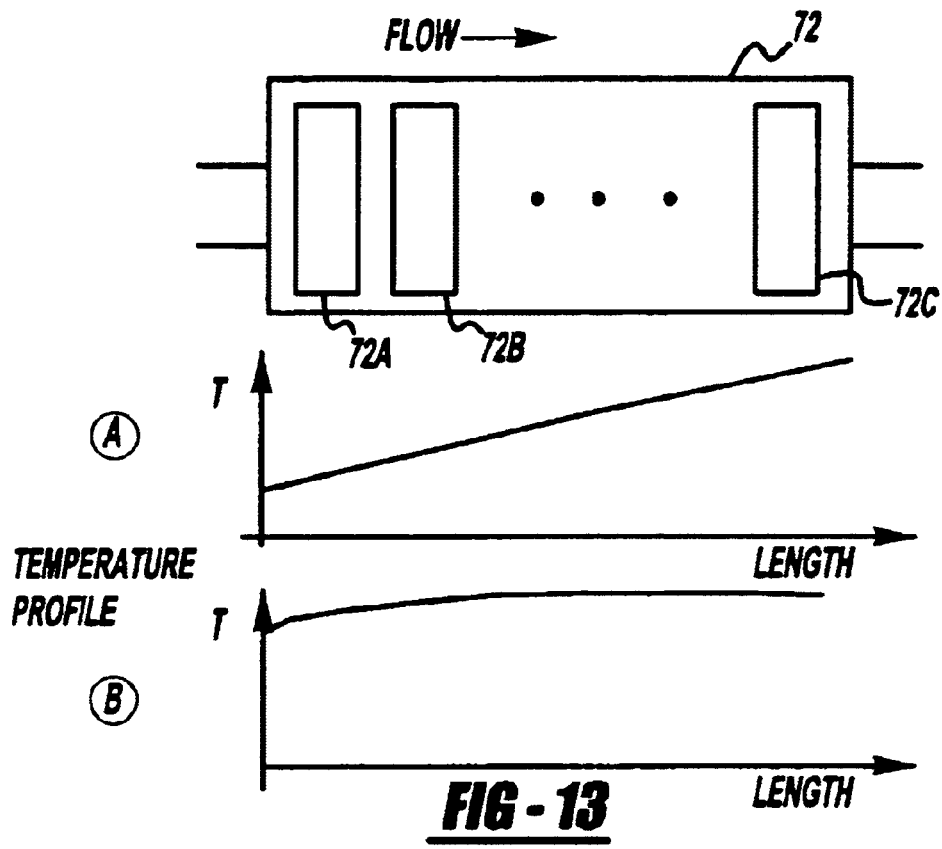
FIG. 13 shows temperature profiles across the length of an emission control device.

As shown in FIG. 13, a more even temperature distribution is obtained. Specifically, FIG. 13 shows device 72 (along with bricks 72A, etc., in the device) with two different temperature profiles (A and B). Profile A is generated with the entire device 72 is repeatedly filled and purged of oxidants, whereas the profile of B is generated with only a portion of the device is repeatedly purged of oxidants. This is because when the entire device is filled and purged, an exothermic reaction is generated across the entire length of the device. However, the heat generated toward the end of the device is mainly just lost out of the exit of the device and does not contribute to heating the forward portion of the device. On the other hand, heat generated in the front portion of the device not only heats that portion, but also transfers heat along the remaining length of the device. Therefore, by having modulation that does not fill and purge the entire device, it is possible to device a greater amount of heat per unit time to the front portion of the catalyst, and then due to more efficient heat transfer, the entire device is heater to the desired temperature with a more even temperature profile.

Note that any of the previous modulation methods are applicable to this aspect of the invention. In other words, although FIG. 12 simply shows the mixture exhaust-air-fuel ratio, this can be generated in any variety of ways, including operating all cylinders lean and then all cylinders reach, operating the engine with different groups of cylinders operating lean and rich, or any of the methods described above herein.

Note also that by adjusting the modulation, it is possible to concentrate heat generated in different areas of the exhaust system. Thus, by operating during some conditions according to the approach described in FIG. 12B it is possible to provide addition heat to the upstream device. Similarly, under other operating conditions, by operating according to the approach described in FIG. 12A, it is possible to provide addition heat to the downstream device. In one example, the method of selecting where to control temperature, and in which device to primarily generate, is governed according to the method of FIG. 15.

Figure 12A:
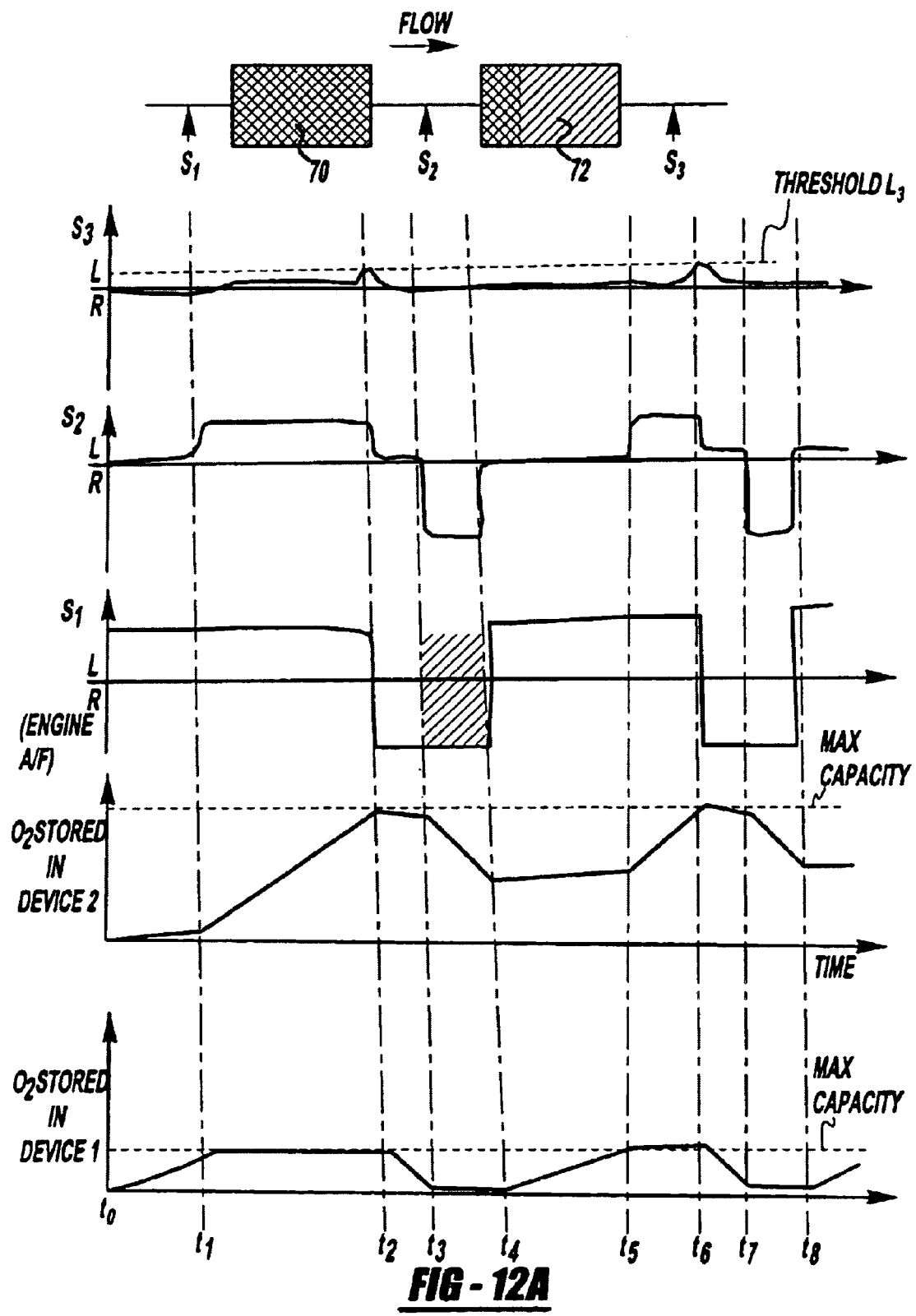
FIGS. 12A–12B show example modulation operation.

Referring now specifically to FIG. 12A, various graphs illustrate modulation according to one aspect of the present invention. In this case, it is desired to generate heat and remove sulfur in device 72 utilizing modulation of exhaust air-fuel mixture. In this case, the exhaust is first operated lean (as shown by sensor S1) at time t0, in a case where devices 70 and 72 happen to be depleted of stored oxidants. This operation is continued, and at time t1, device 70 becomes saturated with oxidants. Lean exhausting is continued until device 2 is saturated with oxidants at time t2. At this point, a measurement from sensor S3 (reaching level L3) indicates that a first amount of oxidants are breaking through device 72 (e.g., a certain oxygen concentration downstream of device 72 is detected). Note that in an alternative embodiment, the routine can estimate this condition utilizing an estimate of oxidants stored in device 72 based on conditions such as, for example, mass air flow, mixture air-fuel ratio, catalyst temperature, and various others.

Continuing with FIG. 12A, at time t2 the exhaust mixture air-fuel ratio of the engine is switching to a rich air-fuel ratio (as shown by sensor S1). First, the oxidants in device 70 are reacted with incoming reductants until time t3, generating heat. Then, a portion of the oxidants in device 72 are reacted until time t4, generating heat. At time t4, the exhaust mixture is returned to a lean air-fuel ratio. As will be described below, the determination at time t4 can be based on various different methods. For example, controller 12 can simply used a predetermined map of time, or a number of engine cycles, or a frequency, or a duty cycle, based on operating conditions such as mass air flow, temperature, load, and various others. Alternatively, controller 12 can use an estimate of oxidants stored in device 72 and when the amount falls below a threshold, the rich operation is ended.

From time t4 to t5, a lean mixture is produced to again fill the upstream and (a part of) the downstream device with oxidants until at t6, the downstream sensor again detects the threshold level L3 of oxygen concentration. Then, the operation previously described is repeated as shown. Specifically, rich operation is utilized from time t6 to t7, and continued to time t8 where it again returns lean. In this way, heat is generated in device 70 and the upstream portion of device 72 to more evenly heat device 72 and remove sulfur from device 72.

Note also that it is possible to determine that amount of reductant entering device 72 using the sensor in location S2. I.e., the reductant amount crosshatched from times t3 to t4. Thus, the change in sensor S2 at time t3 can be used to estimate the amount of oxidants being reacted from time t3 to t4 and thereby obtain a more accurate estimate of oxidant storage and more accurate temperature control.

Figure 12B:
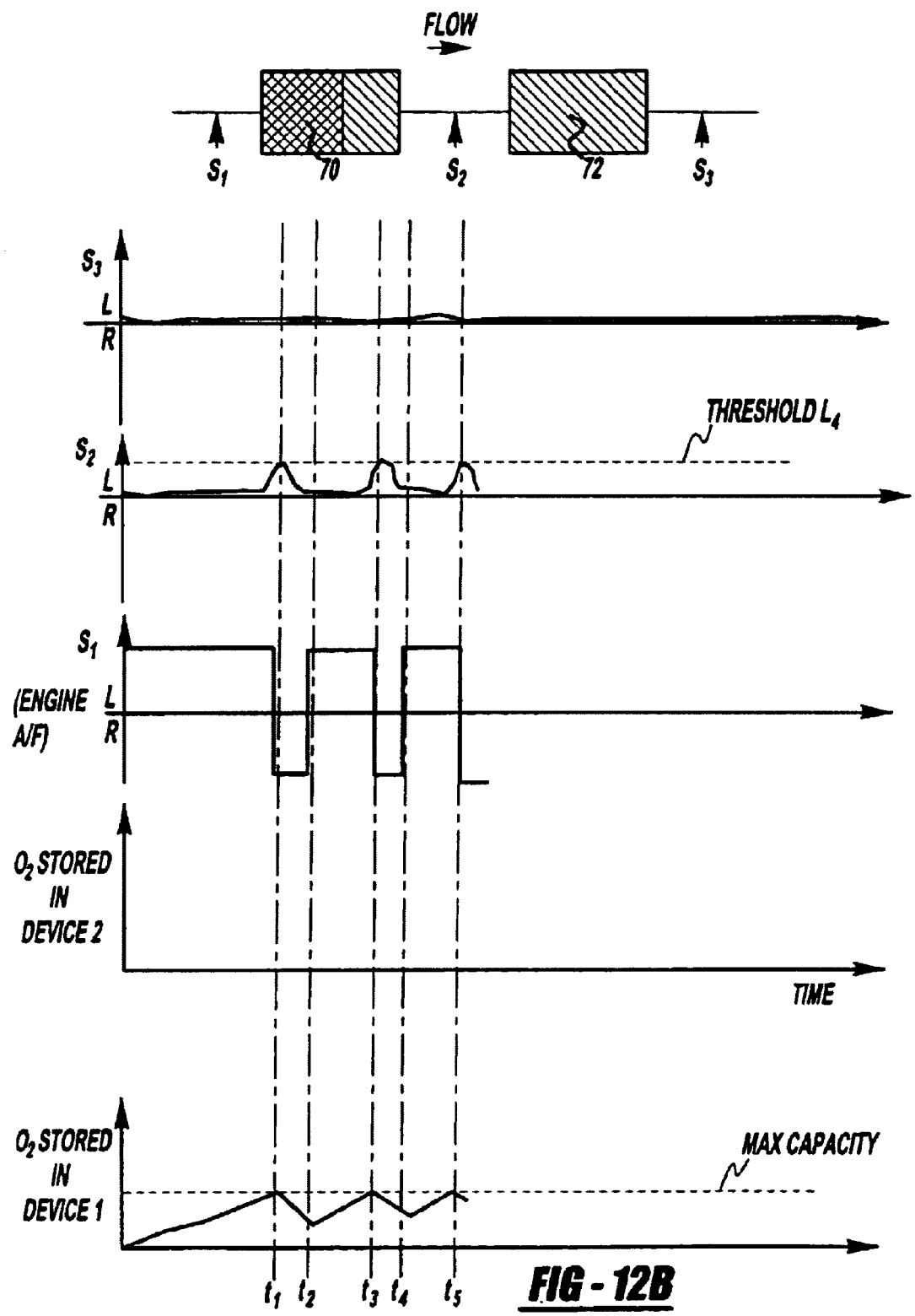

Referring now to FIG. 12B, various graphs illustrate modulation according to another aspect of the present invention. In this case, it is desired to generate heat in device 70 (because, for example, device 72 is not at a temperature that can support exothermic reactions) utilizing modulation of exhaust air-fuel mixture. In this case, the exhaust is first operated lean (as shown by sensor S1) at time to, in a case where devices 70 and 72 happen to be depleted of stored oxidants. This operation is continued, and at time t1, device 70 becomes saturated with oxidants as detected by sensor S2 reaching oxygen concentration level (threshold) L4. At this point, a rich mixture is produced until time t2, when the routine estimates that a selected amount of oxidants stored in device 70 have been depleted. Again, as described above with regard to FIG. 12A, there are various other methods that can be used to determine when to end rich operation. Then, lean operation is again utilized and the process repeated as shown at times t3, t4, and t5 as just a few examples.

Figure 14:
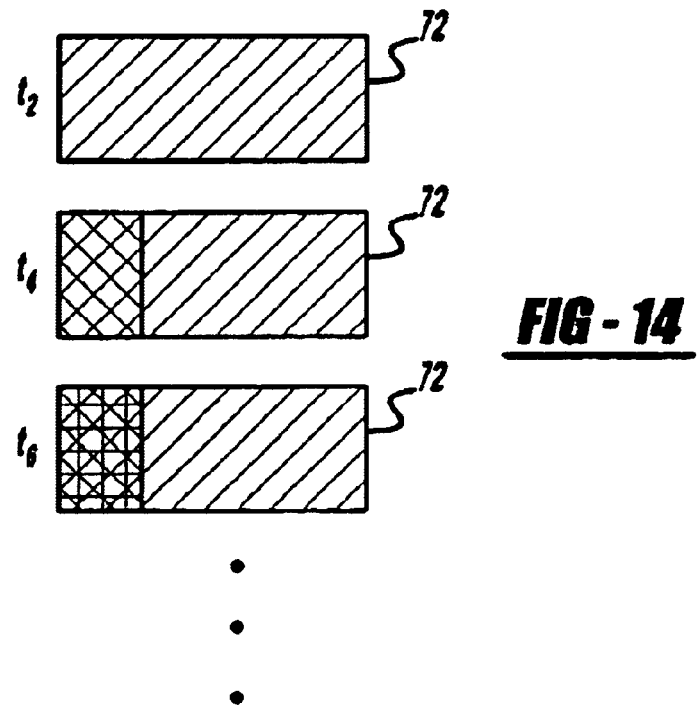
FIG. 14 shows example states of a catalyst at different instances.

FIG. 14 shows in more detail the state of the catalyst according to operation shown in FIG. 12A. Specifically, the top diagram of FIG. 14 shows device 72 saturated with oxygen (the hatching with diagonal lines from the bottom left to upper right) at time t2 of FIG. 12A. The middle diagram of FIG. 14 shows device 72 with reductants reacting with oxygen stored in an upstream portion of device 72 (the hatching with diagonal lines from the bottom right to upper left) at time t4 of FIG. 12A. The bottom diagram of FIG. 14 shows device 72 again filling the upstream portion of device 72 with oxidants that were previously used for reaction (the hatching with horizontal lines) at time t6 of FIG. 12A. As such, in this way, the heat generated in the upstream portion not only provides significant heat input per unit time to the upstream portion, but the exhaust flow carries this heat downstream to more evenly heat the entire device 72 as shown in FIG. 13, profile B (unlike modulation that fills and purges the entire device 72 as shown in profile A of FIG. 13).

Figure 15:
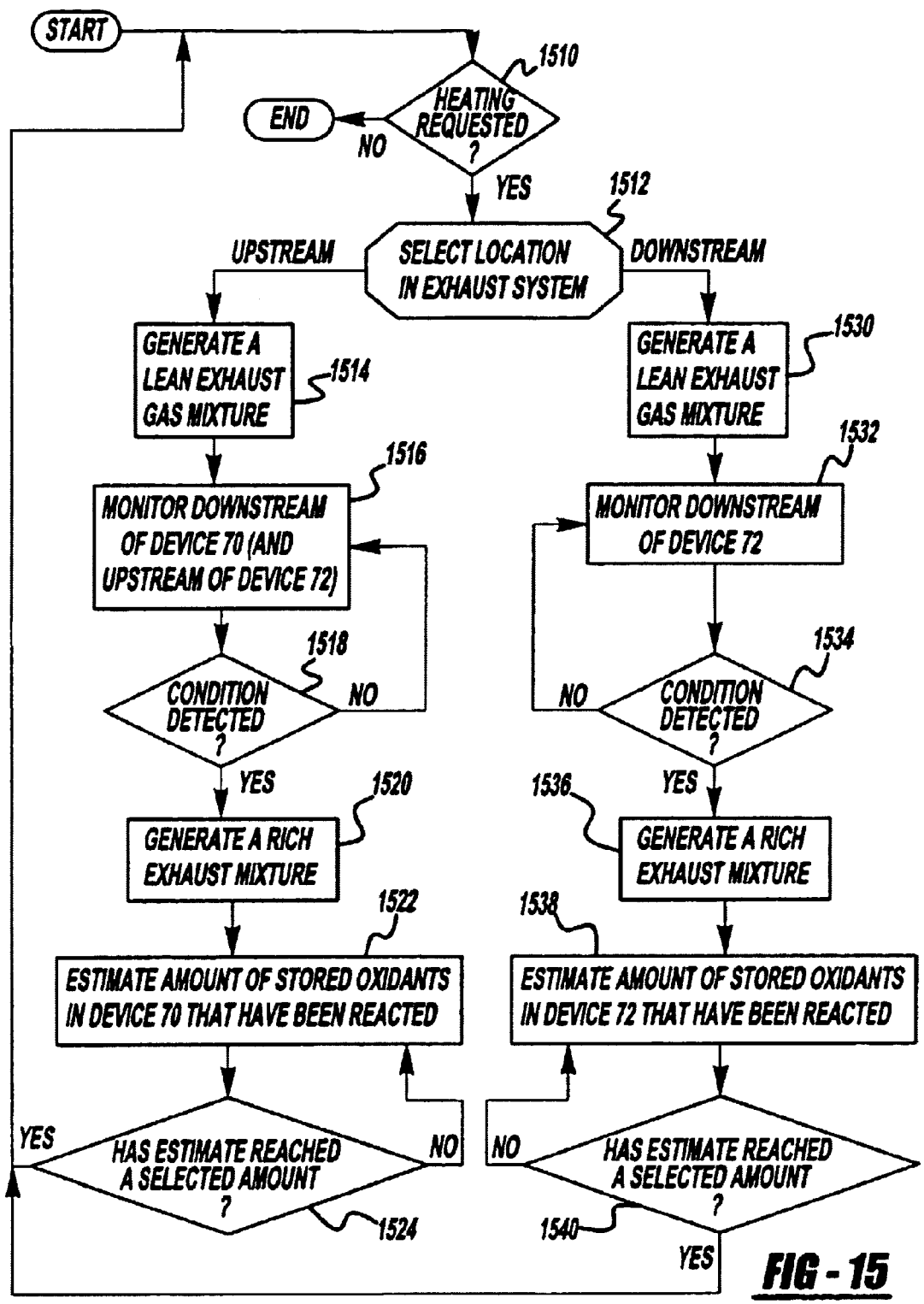

Referring now to FIG. 15, a routine is described for selecting the location along the length exhaust flow of the exhaust system in which it is desired to control temperature and generate heat. First, in step 1510, the routine determines whether heating in the exhaust system is requested. For example, the routine can determine whether it is desired to remove sulfur from either device 70 or device 72, or both. Alternatively, the routine can determine whether a temperature of a selected location along the length of the emission control system has fallen below a desired temperature. When the answer to step 1510 is "yes", the routine continues to step 1512. In step 1512, the routine determines whether the selected location for temperature control (or heat generation) is in an upstream or a downstream location. When it is desired to generate heat in the upstream emission control device, the routine continues from step 1512 to step 1514. Alternatively, when it is desired to generate heat in both the upstream and the downstream emission control device, the routine moves to step 1530 from step 1512.

In step 1514, the routine generates a lean exhaust gas mixture. As described above, this can be accomplished in a variety of ways such as, for example, operating all the cylinders lean, or operating the first group of cylinders at a first lean air-fuel ratio, and a second group of cylinders at a second lean air-fuel ratio, or operating a first group of cylinders at a lean air-fuel ratio and a second group of cylinders at a stoichiometric or rich air-fuel ratio. Next, in step 1516, the routine monitors a downstream location downstream of device 70 and upstream of device 72. In one example, this entails monitoring an exhaust gas oxygen sensor in the location of sensor S2. In one example, the sensor is a switching type exhaust gas oxygen sensor, known as a HEGO sensor. Alternatively, a UEGO sensor could also be utilized. In step 1518, the routine determines whether a specified condition has been detected in the monitored location. In one particular example, as shown in FIG. 12B at time T1, the routine determines whether the detected oxygen concentration has risen above threshold L4.

When the answer to step 1518 is "no" (i.e., the condition has not been detected), the routine returns to step 1516 to continue monitoring. Alternatively, when the answer to step 1518 is "yes", the routine continues to step 1520 to generate a rich exhaust gas mixture. As described above, there are various methods for generating the rich exhaust mixture, such as, for example: operating all cylinders of the engine with a rich air-fuel ratio, or operating a first group of cylinders at a rich air-fuel ratio and a second group of cylinders at a less rich air-fuel ratio, which can be stoichiometric or lean.

Then, in step 1522, the routine estimates the amount of stored oxidants in device 70 that have been reacted. In other words, the routine can estimate the amount of remaining oxidants stored in device 70 or, alternatively, can estimate the amount of oxidants that have been reacted with incoming reductants. Still another alternative would be to estimate the amount of incoming reductants, or utilize a predetermined map of times, or frequencies, or duty cycles, to estimate the amount of reacted material before a selected amount of reductant breakthrough occurs. In step 1524, the routine determines whether the estimate has reached a selected amount which, in one example, can be illustrated at time T2 of FIG. 12B. When the answer to step 1524 is "no", the routine returns to step 1522 to continue estimating the amount of stored oxidants. Alternatively, when the answer to step 1524 is "yes", the routine returns to step 1510.

Continuing with FIG. 15, when the routine transitions from step 1512 to 1530, the routine generates a lean exhaust gas mixture in 1530. As described above with regard to step 1514, there are various methods for generating the lean mixture. Then, in step 1532 the routine monitors downstream of device 72. Again, as described with regard to step 1516, there are various approaches for providing this monitoring, such as utilizing a HEGO or a UEGO sensor. Still another approach uses an estimate of air-fuel ratio generated based on operating conditions such as mass air flow, air-fuel ratio, and catalyst temperature.

Then, in step 1534, the routine determines whether the condition is detected downstream of device 72. When the answer to step 1534 is "no", the routine returns to step 1532 to continue monitoring. Alternatively, when the condition is detected, (see for example time T2 of FIG. 12A), the routine continues to step 1536. In step 1536, the routine generates a rich exhaust gas mixture. As described above herein and with particular reference to step 1520, various methods are available for generating the rich exhaust gas mixture. Next, in step 1538, the routine estimates the amount of stored oxidants in device 72 that have been reacted. This is accomplished in a manner similar to that in step 1522 or any of its alternative approaches. The routine then monitors in step 1540 whether the estimate has reached selected amount (see for example time T4 FIG. 12A). When the answer to step 1540 is "no", the routine returns to step 1538 to continue estimating. Alternatively, when the answer to step 1540 is "yes", the routine returns to step 1510.

Note that in the approach outlined above, the amount of heat generated at different locations of the exhaust system can be adjusted by adjusting either, or both of, the level of the lean/rich mixture air-fuel ratio, or the amount of oxidants that are depleted (e.g., the size of the cross hatching of device 72 in FIG. 12A, or the size of the cross hatching of device 70 in FIG. 12B). In other words, the threshold amount of depleted oxidants in steps 1524 and 1540 can be adjusted to control device temperature to approach a desired device temperature. This would potentially result in a higher frequency oscillation (based on various other factors) thereby generating greater heat per unit time.

Also, with regard to step 1524 and 1540, as described above, note that various alternative approaches can be used to end rich operation before the downstream sensor indicates significant breakthrough of reductant (e.g., by switching rich). For example, in still another approach, controller 12 can simply control modulation duty cycle (or frequency) in an open loop fashion (only on the rich side) to adjust location and amounts of generated heat in the exhaust system.

Finally, note, in another alternate approach, the emission system could be purged of stored oxidants (via rich operation), and then operated with a lean mixture to fill only the front portion of a device. Then, rich operation would purge only this stored oxygen to generate heat in a specified location and obtain more even heating. However, this would result in breakthrough of reductants (rather than oxidants as in the method shown in FIGS. 12 and 14). Nonetheless, there may be conditions where breakthrough of reductants is less undesirable than breakthrough of oxidants. Note also that the threshold levels of steps 1524 and 1540 can be set to different amounts due to, for example, the different in oxidant storage capacities between devices 70 and 72. Alternatively, they can be the same value.

Figure 16A:
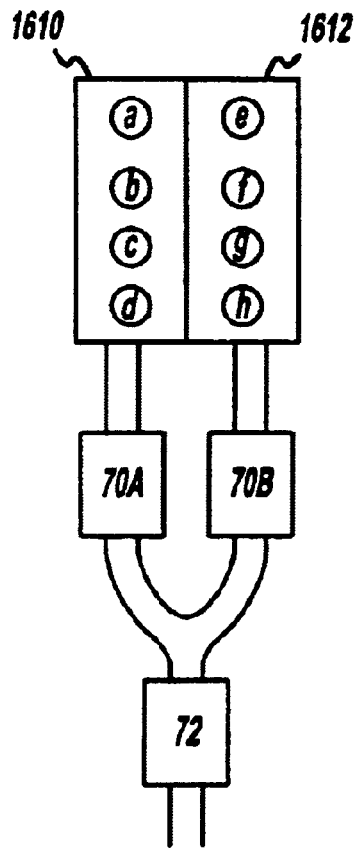
FIGS. 16A–16B show alternative system configurations.
Figure 16B:
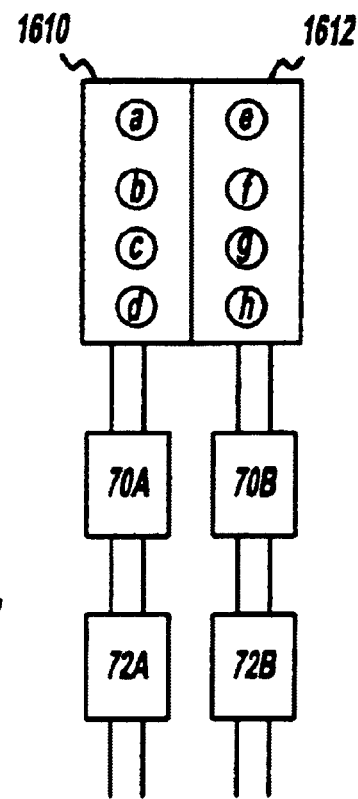

Referring now to FIG. 16, yet another alternative embodiment of the present invention is described. In this example, a V-8 engine is shown, although a V-10, V-12, V-6, etc., could be used specifically, FIG. 16A shows a V-8 engine with first and second banks 1610 and 1612. Further, upstream devices 70A and 70B are shown both leading to a single downstream device 72. Alternatively, as shown in FIG. 16B, a completely separate path can be used with devices 70A and 72A in one path, and device 70B and 72B in another path.

In either of these configurations, each bank (1610, 1612) can each be broken down into at least two groups of cylinders, and then operated as described above herein. For example, cylinders a and b can be operated between lean and stoichiometry, and cylinders c and d can be operated between rich and stoichiometry (but out of phase as shown in FIGS. 3C or 3D, for example. Likewise, cylinders e and f can be operated between lean and stoichiometry, and cylinders g and h can be operated between rich and stoichiometry. Further still, different groups can be created, such as, for example, cylinders a, f g, and d can be operated between lean and stoichiometry, and cylinders b, c, e, an h can be operated between rich and stoichiometry. Various other combinations can also be generated.

The above description has been applied to gasoline lean burn engines. However, several of the systems and methodologies described above are equally applicable to diesel exhaust systems. However, because diesel engines may not be able to operated rich, a rich exhaust gas mixture can be generated via an external reductant (e.g., diesel fuel) that is injected into the exhaust gas via a reductant injector. Furthermore, various methods of the present invention are applicable to a single cylinder engine that operates between lean and rich to generate exhaust gas heat.

We claim:

1. A system for an engine having at least a first group and a second group of cylinders, the system comprising:
   an emission control device coupled to said first and second groups of cylinders; and
   a computer storage medium having a computer program encoded therein for controlling fuel injected into the first and second group of cylinders, comprising:
   code for, during a first interval, operating in a first mode where said first group of cylinders is lean of stoichiometry and said second group of cylinders is at a first air-fuel ratio at stoichiometry or rich of stoichiometry;
   code for, during a second interval, operating in a second mode where said second group of cylinders is at a second air-fuel ratio rich of stoichiometry and richer than said first air-fuel ratio;
   code for repeatedly switching between said first and second mode to reduce sulfur contamination of said emission control device; and
   code for adjusting both said first and second air-fuel ratio values based on an exhaust temperature and engine flow.

2. The system of claim 1 wherein during said second interval, said first group of cylinders operates lean of stoichiometry.

3. The system of claim 1 wherein during said second interval, said first group of cylinders operates at stoichiometry.

4. The system of claim 1 further comprising an oxygen sensor coupled downstream of said emission control device.

5. A system for an engine having at least a first group and a second group of cylinders, the system comprising:
   an emission control device coupled to said first and second groups of cylinders;
   an oxygen sensor coupled downstream of said emission control device; and
   a computer storage medium having a computer program encoded therein for controlling fuel injected into the first and second group of cylinders, comprising:
   code for, during a first interval, operating said first group of cylinders lean of stoichiometry and said second group of cylinders at a first air-fuel ratio at stoichiometry or rich of stoichiometry;
   code for, during a second interval, operating said second group of cylinders at a second air-fuel ratio rich of stoichiometry and richer than said first air-fuel ratio;
   code for adjusting both said first and second air-fuel ratio values based on an exhaust temperature and engine flow; and
   code for changing between said first and second intervals based on said oxygen sensor.

6. The system of claim 5 wherein said emission control device is a downstream emission control coupled downstream of an upstream emission control device.

7. The system of claim 5 wherein said emission control device is an upstream emission control coupled upstream of a downstream emission control device.

8. The system of claim 5 wherein said code for changing between said first and second intervals is based on said oxygen sensor changes based on a comparison of an output of said oxygen sensor with a threshold value.

9. A system for an engine having at least a first group and a second group of cylinders, the system comprising:
   an emission control device coupled to said first and second groups of cylinders; and
   a computer storage medium having a computer program encoded therein for controlling fuel injected into the first and second group of cylinders, comprising:
   code for, during a first interval, operating in a first mode where said first group of cylinders is lean of stoichiometry and said second group of cylinders is at a first air-fuel ratio at stoichiometry;
   code for, during a second interval, operating in a second mode where said first group of cylinders is at stoichiometry and said second group of cylinders is at a rich air-fuel ratio;
   code for repeatedly switching between said first and second mode to reduce sulfur contamination of said emission control device; and
   code for adjusting said rich air-fuel ratio to control exhaust temperature during variations in exhaust flow carrying away heat.

10. The system of claim 9 further comprising an oxygen sensor coupled downstream of said emission control device.

11. A system for an engine having at least a first group and a second group of cylinders, the system comprising:
    an emission control device coupled to said first and second groups of cylinders;
    an oxygen sensor coupled downstream of said emission control device; and
    a computer storage medium having a computer program encoded therein for controlling fuel injected into the first and second group of cylinders, comprising:
    code for, during a first interval, operating said first group of cylinders lean of stoichiometry and said second group of cylinders at a first air-fuel ratio at stoichiometry;
    code for, during a second interval, operating said first group of cylinders at stoichiometry and operating said second group of cylinders at a rich air-fuel ratio;
    code for adjusting said rich air-fuel ratio based on an exhaust temperature and engine flow; and
    code for changing between said first and second intervals based on said oxygen sensor.

12. The system of claim 11 wherein said emission control device is a downstream emission control coupled downstream of an upstream emission control device.

13. The system of claim 11 wherein said emission control device is an upstream emission control coupled upstream of a downstream emission control device.

14. The system of claim 11 wherein said code for changing between said first and second intervals is based on said oxygen sensor changes based on a comparison of an output of said oxygen sensor with a threshold value.

* * * * *